United States Patent
Matsuura et al.

(10) Patent No.: US 10,088,579 B2
(45) Date of Patent: Oct. 2, 2018

(54) RADIATION MEASURING APPARATUS AND RADIATION MEASURING METHOD

(71) Applicants: MITSUBISHI HEAVY INDUSTRIES, LTD., Tokyo (JP); Japan Aerospace Exploration Agency, Tokyo (JP); HAMAMATSU PHOTONICS K.K., Shizuoka (JP)

(72) Inventors: Daisuke Matsuura, Tokyo (JP); Yoshikatsu Kuroda, Tokyo (JP); Kei Gemba, Tokyo (JP); Tadayuki Takahashi, Kanagawa (JP); Shin Watanabe, Kanagawa (JP); Shin'ichiro Takeda, Kanagawa (JP); Hiroo Yamamoto, Shizuoka (JP); Kazumasa Kosugi, Shizuoka (JP); Kazuhisa Yamamura, Shizuoka (JP)

(73) Assignees: MITSUBISHI HEAVY INDUSTRIES, LTD., Tokyo (JP); JAPAN AEROSPACE EXPLORATION AGENCY, Tokyo (JP); HAMAMATSU PHOTONICS K.K., Shizuoka (JP)

( * ) Notice: Subject to any disclaimer, the term of this patent is extended or adjusted under 35 U.S.C. 154(b) by 0 days.

(21) Appl. No.: 15/735,389

(22) PCT Filed: Jul. 22, 2016

(86) PCT No.: PCT/JP2016/071642
§ 371 (c)(1),
(2) Date: Dec. 11, 2017

(87) PCT Pub. No.: WO2017/018363
PCT Pub. Date: Feb. 2, 2017

(65) Prior Publication Data
US 2018/0180747 A1 Jun. 28, 2018

(30) Foreign Application Priority Data
Jul. 24, 2015 (JP) .................. 2015-147025

(51) Int. Cl.
*G01T 1/29* (2006.01)
*G01T 1/24* (2006.01)

(52) U.S. Cl.
CPC .............. *G01T 1/241* (2013.01); *G01T 1/244* (2013.01); *G01T 1/247* (2013.01); *G01T 1/2907* (2013.01)

(58) Field of Classification Search
CPC ....... G01T 1/2928; G01T 1/24; G01T 1/1647; H01L 31/115; H01L 31/00
See application file for complete search history.

(56) References Cited

U.S. PATENT DOCUMENTS 5,821,541 A   10/1998 Turner
7,750,308 B2   7/2010 Shirahata et al.
(Continued)

FOREIGN PATENT DOCUMENTS

JP   2002-357661   12/2002
JP   2008-232641   10/2008
(Continued)

OTHER PUBLICATIONS

Ghoggali: "Optimization of the performance of a pixellated germanium Compton Camera" Thesis Doctor of Philosophy, Department of Medical Physics and Bioengineering, University College London 2013; p. 1-170.*
(Continued)

*Primary Examiner* — David Porta
*Assistant Examiner* — Mamadou Faye
(74) *Attorney, Agent, or Firm* — Wenderoth, Lind & Ponack, L.L.P.

(57) ABSTRACT

A radiation measuring apparatus (20) includes a scatterer detector (10A), an absorber detector (10B) and a processing unit (12). Pixel electrodes (2) of the scatterer detector (10A) and the absorber detector (10B) are arranged such that a distance between centers of two neighbor pixel electrodes (2) is smaller than a mean free path of a recoil electron generated in the Compton scattering of an electromagnetic radiation. The processing unit (12) specifies and incidence direction of the electromagnetic radiation based on a recoiling direction to which the recoil electron recoils. In this way, an electron tracking-type Compton camera is realized which confines the incidence direction of the electromagnetic radiation by using the recoiling direction of the recoil electron in a Compton camera using a semiconductor detector.

8 Claims, 18 Drawing Sheets

(56) References Cited

U.S. PATENT DOCUMENTS

| | | |
|---|---|---|
| 9,134,440 B2 | 9/2015 | Sanuki et al. |
| 2008/0128631 A1 | 6/2008 | Suhami |
| 2009/0202041 A1 | 8/2009 | Shirahata et al. |
| 2012/0112087 A1 | 5/2012 | Yokoi |
| 2014/0284488 A1 | 9/2014 | Sanuki et al. |
| 2017/0261624 A1* | 9/2017 | Ida .......................... G01T 1/161 |

FOREIGN PATENT DOCUMENTS

| | | |
|---|---|---|
| JP | 2014-185852 | 10/2014 |
| WO | 2007/145154 | 12/2007 |
| WO | 2011/001610 | 1/2011 |

OTHER PUBLICATIONS

International Search Report dated Sep. 13, 2016 in International Application No. PCT/JP2016/071642.
International Preliminary Report on Patentability dated Feb. 8, 2018 in International Application No. PCT/JP2016/071642.
Extended European Search Report dated Jul. 13, 2018 in corresponding European Patent Application No. 16830468.1.

* cited by examiner

RADIATION MEASURING APPARATUS AND RADIATION MEASURING METHOD

TECHNICAL FIELD

The present invention relates to a radiation measuring apparatus and a radiation measuring method, and especially, to a technique to detect an electromagnetic radiation such as X-ray and gamma ray by using a semiconductor detector.

BACKGROUND ART

A radiation measuring apparatus used to detect an electromagnetic radiation such as X-ray and gamma ray is sometimes configured to be able to specify an incidence direction of the electromagnetic radiation when an event has occurred in which the electromagnetic radiation is inputted to a detector of the radiation measuring apparatus. It becomes possible to specify a spatial distribution of radiation sources by specifying the incidence direction of the electromagnetic radiation. This is very useful in practical use.

One of the radiation measuring apparatuses that are configured to specify the incidence direction of the electromagnetic radiation is a Compton camera. The Compton camera is a radiation measuring apparatus that images a spatial distribution of radiation sources by using the Compton scattering. The Compton camera specifies the incidence direction of the electromagnetic radiation (e.g. X-ray, gamma ray) by using the Compton scattering, and generates the image showing the spatial distribution of radiation sources from the specified incidence directions.

FIG. 1 is a diagram showing the overview of a Compton scattering of gamma ray. When the gamma ray is inputted to substance, a photon of the incident gamma ray collides with an electron in the substance to be scattered. At this time, the electron with which the photon has collided spatters (the spattered electron is called "a recoil electron") and a part of energy of the photon of the incident gamma ray is given to the electron. Thus, the energy of the scattered photon of gamma ray becomes lower than that of the incident gamma ray. Supposing that the energy of the photon of incident gamma ray is $E_0$, the energy acquired by the recoil electron is $E_1$, and the energy of the scattered photon of gamma ray is $E_2$, the following equation (1) is met:

$$E_0 = E_1 + E_2 \quad (1)$$

FIG. 2 is a diagram showing the principle of a Compton camera, especially, the principle of specifying the incidence direction of the electromagnetic radiation. Typically, the detecting section of Compton camera has a scatterer and an absorber. An event has occurred in which the photon of electromagnetic radiation inputted from a radiation source is scattered by the scatterer in the Compton scattering, and the photon to have been scattered in the Compton scattering is absorbed by the absorber in the photoelectric absorption, a scattering angle θ of the electromagnetic radiation (in other words, an angle between a line segment which links the radiation source and the position $X_1$ and a line passing through positions $X_1$ and $X_2$) is given by the following equation (2):

[Number 1]

$$\cos\theta = 1 - m_e c^2 \left( \frac{1}{E_2} - \frac{1}{E_1 + E_2} \right) \quad (2)$$

where $m_e$ is a rest mass of an electron, and c is a speed of light. Also, $E_1$ is the energy acquired by the recoil electron in the scatterer in the Compton scattering and $E_2$ is the energy of the photon absorbed by the absorber.

The Compton camera estimates a spatial distribution of radiation sources based on data of the scattering angle θ of the electromagnetic radiation obtained in this way and images the spatial distribution of radiation sources. More specifically, a Compton cone (a cone surface configured as a set of points where radiation sources can be located) in each event is reconstructed from data of a position $X_1$ where the Compton scattering has occurred in each event, a position $X_2$ where the photoelectric absorption has occurred, and the scattering angle θ of the electromagnetic radiation in the Compton scattering, and an image corresponding to the superposition of Compton cones of the respective events is generated as a radiation source distribution image showing the spatial distribution of radiation sources.

As would be understood from the above, the scattering angle θ of the electromagnetic radiation can be calculated only from the position $X_1$ where the Compton scattering has occurred in each event, the energy $E_1$ acquired by the recoil electron in the Compton scattering, and the energy $E_2$ of the photon absorbed by the absorber. The position of the radiation source is specified only as a point on a circle where the radiation source can exist. However, if a recoiling direction of the recoil electron (a direction to which the recoil electron recoils) can be specified, another circle (another cone surface) can be defined based on the recoiling direction of the recoil electron. Thus, theoretically, it is possible to specify the incidence direction of the electromagnetic radiation as a direction which passes intersecting points of two circles. However, actually, the incidence direction of the electromagnetic radiation is specified as an arc due to the fluctuation of energy of the recoil electron, as shown in FIG. 3. For example, such a technique is disclosed in the international publication WO 2007/145154 (Patent Literature 1). The Compton camera which confines the incidence direction of the electromagnetic radiation based on the recoiling direction of the recoil electron is sometimes called an electron tracking-type Compton camera.

As the techniques in relation to the present invention, the international publication WO 2011/001610 (Patent Literature 2) discloses a gamma ray direction detecting apparatus having a detector including a plurality of detection pixels which detect gamma ray.

CITATION LIST

Patent Literature

[Patent Literature 1] WO 2007/145154A
[Patent Literature 2] WO 2011/001610A

SUMMARY OF THE INVENTION

However, the Compton camera using a semiconductor detector is not realized because a technique of confining the incidence direction of the electromagnetic radiation by using the recoiling direction of a recoil electron is generally not established in a practical form. An examination result exists in which measures the recoiling direction of the recoil electron is measured fey using CCD (charge coupled device) as the semiconductor detector.

However, because a read time of data is very long in the CCD, the dead time becomes very large so that it is difficult to realize a practical Compton camera. In the international publication WO 2007/145154A (Patent Literature 1), a gas chamber-type detector is used as a detector in which the Compton scattering occurs. However, the gas chamber-type detector must be made large-sized to secure enough detection efficiency to gamma ray, and the detector of the absorption section needs to be made large-sized. Also, in order to get a high angle resolution, a high energy resolution is necessary. However, the gas chamber-type detector is low in the energy resolution, compared with the semiconductor detector.

Therefore, an object of the present invention is to realize an electron tracking-type Compton camera which confines an incidence direction of an electromagnetic radiation by using a recoiling direction of a recoil electron in a Compton camera using a semiconductor detector.

The other objects and new features of the present invention will be understood from the following disclosure.

According to an aspect of the present invention, the radiation measuring apparatus includes at least one scatterer detector, functioning as a scatterer that scatters an electromagnetic radiation of a measurement object; at least one absorber detector functioning as an absorber that absorbs the electromagnetic radiation; and a processing unit. Each of the scatterer detector and the absorber detector includes: a semiconductor substrate; and a plurality of pixel electrodes arranged in a matrix on a first main surface of the semiconductor substrate. The plurality of pixel electrodes are arranged such that a distance between centers of two neighbor pixel electrodes is smaller than a mean free path of a recoil electron generated in the Compton scattering of the electromagnetic radiation. The processing unit extracts events based on signals obtained from the scatterer detector and the absorber detector, and specifies an incidence direction of the electromagnetic radiation based on a recoiling direction to which a recoil electron recoils, to each of the extracted events, in each of which the Compton scattering has occurred in either of the scatterer detectors, the recoil electron generated in the Compton scattering in either of the scatterer detectors recoils to a direction having an in-plane component of the semiconductor substrate in an inside of the scatterer detector in which the Compton scattering has occurred, and photoelectric absorption has occurred in which the photon scattered in the Compton scattering is absorbed in either of the absorber detectors.

When energy of a photon of the electromagnetic radiation of the measurement object is 0.3 to 2.0 MeV, it is desirable that the plurality of pixel electrodes of the scatterer detector and the absorber detector are arranged such that the distance of the centers of the two neighbor pixel electrodes is in a range of 10 to 20 µm.

In the suitable embodiment, the scatterer detector further includes a plurality of back electrodes arranged on a second main surface which is opposite to the first main surface of the semiconductor substrate, and each of the plurality of back electrodes of the scatterer detector is arranged to be opposite to more than one of the plurality of pixel electrodes of the scatterer detector. Here, a number of the plurality of back electrodes is less than a number of the plurality of pixel electrodes in each of the scatterer detectors. In this case, the radiation measuring apparatus may further includes: a first signal processing section configured to generate first pixel electrode measurement data from a first analog signal read from the plurality of pixel electrodes of the scatterer detector; a temporary storing area provided to temporary store the first pixel electrode measurement data; a second signal processing section configured to generates back electrode measurement data from a second analog signal read from the plurality of back electrodes of the scatterer detector; and a data processing section. In this case, it is desirable that the data processing section reads from the temporary storing area, pixel electrode measurement data which are selected the first pixel electrode measurement data according to the back electrode measurement data, to transfer to the processing unit, and that the processing unit carries out extraction of the event and specification of the incidence direction of the electromagnetic radiation based on the selected pixel electrode measurement data.

In this case, the radiation measuring apparatus further includes; a third signal processing section configured to generate second pixel electrode measurement data from a third analog signal read from the plurality of pixel electrodes of the absorber detector. It is desirable that the data processing section, selects the selected pixel electrode measurement data according to the back electrode measurement data and the second pixel electrode measurement data.

In one embodiment, it is desirable that the data processing section transfers to the processing unit, the first pixel electrode measurement data obtained in a frame period, the second pixel electrode measurement data, and the back electrode measurement data, when the back electrode measurement data and the second pixel electrode measurement data obtained in the frame period meet a predetermined condition, and that the the processing unit carries out the extraction of the event and the specification of the incidence direction of the electromagnetic radiation based on the first pixel electrode measurement data, the second pixel electrode measurement data, and the back electrode measurement data obtained in the frame period.

It is desirable that when the first signal processing section is integrated into a signal processing IC, each of the plurality of pixel electrodes of the scatterer detector is connected with a pad prepared in the signal processing IC through a bump.

In a suitable embodiment, the plurality of pixel electrodes of the scatterer detector are arranged in first direction parallel to the first main surface and to a second direction parallel to the first main surface and perpendicular to the first direction, and each of the plurality of back electrodes is formed to extend to the first direction.

In one embodiment, each of the scatterer detector and the absorber detector comprises a plurality of back electrodes arranged on the second main surface which is opposite to the first main surface of the semi conductor substrate, and each or the plurality of back electrodes is arranged to be opposite to more than one of the plurality of pixel electrodes, and a number of the plurality of back electrodes is less than a number of the plurality of pixel electrodes is in each of the scatterer detector and the absorber detector. In this case, desirably, the radiation measuring apparatus further includes: a first signal processing section configured to generate pixel electrode measurement data from a first analog signal read from the plurality of pixel electrodes of the scatterer detector and the absorber detector; a temporary storing area provided to temporarily store the pixel electrode measurement data a second signal processing section configured to generate back electrode measurement data from a second analog signal read from the plurality of back electrode of the scatterer detector and the absorber detector; and a data processing section. The the processing unit carries out the extraction of the event and the specification of the incidence direction of the electromagnetic radiation based on the selected pixel electrode measurement data.

According to another aspect of the present invention, the semiconductor detector used to detect a radiation includes: a semiconductor substrate, a plurality of pixel electrodes arranged in a matrix on a first main surface of the semiconductor substrate, and a plurality of back electrodes arranged on a second main surface which is opposite to the first main surface of the semiconductor substrate. Each of the plurality of back electrodes is arranged to be opposite to more than one of the plurality of pixel electrodes, and a number of the plurality of back electrodes is less than a number of the plurality of pixel electrodes.

According to another aspect of the present invention, the radiation measuring apparatus includes: the above-mentioned semiconductor detectors; a first signal processing section configured to generate first pixel electrode measurement data from a first analog signal read from the plurality of pixel electrodes; a temporary storing area provided to temporary store the first pixel electrode measurement data; a second signal processing section configured to generates back electrode measurement data from a second analog signal read from the plurality of back electrodes; a data processing section configured to read from the temporary storing area, pixel electrode measurement data which are selected the first pixel electrode measurement data according to the back electrode measurement data, to transfer to the processing unit; and a processing unit configured to carry out extraction of the event and specification of the incidence direction of the electromagnetic radiation based on the selected pixel electrode measurement data.

It is desirable that the processing unit carries out an operation to measure the electromagnetic radiation based on the back electrode measurement data in addition to the pixel electrode measurement data read from the temporary storing area.

According to another aspect of the present invention, radiation measuring apparatus is provided to realize an electron tracking-type Compton camera using a radiation measuring apparatus which includes a scatterer detector functioning as a scatterer of scattering art electromagnetic radiation of a measurement object; and an absorber detector functioning as an absorber of absorbing the electromagnetic radiation, wherein each of the scatterer detector and the absorber detector includes a semiconductor substrate and a plurality of pixel electrodes arranged on a main surface of the semiconductor substrate, and wherein the plurality of pixel electrodes of each of the scatterer detector and the absorber detector are arranged such that a distance between centers of two neighbor pixel electrodes is smaller than a mean free path of a recoil electron generated in the Compton scattering of the electromagnetic radiation. The radiation measuring method includes: extracting based on a signal obtained from the scatterer detector and the absorber detector, an event, in which the Compton scattering has occurred in either of the scatterer detectors, the recoil electron generated in the Compton scattering in either of the scatterer detectors recoils to a direction having an in-plane component of the semiconductor substrate in an inside of the scatterer detector in which the Compton scattering has occurred, and photoelectric absorption has occurred in which the photon scattered in the Compton scattering is absorbed in either of the absorber detectors; and specifying the incidence direction of the electromagnetic radiation based on the recoiling direction to which the recoil electron recoils.

According to the present invention, in the Compton camera using the semiconductor detector, a technique of realizing an electron tracking-type Compton camera can be provided which confines the incidence direction of the electromagnetic radiation by using the recoiling direction of the recoil electron.

DESCRIPTION OF THE EMBODIMENTS

Figure 1:
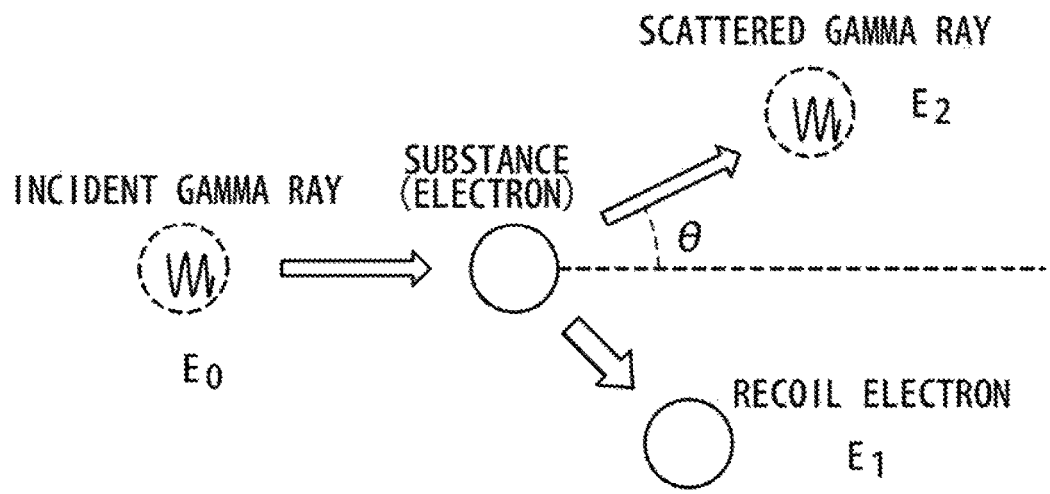
FIG. 1 is a conceptual diagram showing the Compton scattering of gamma ray.
Figure 2:
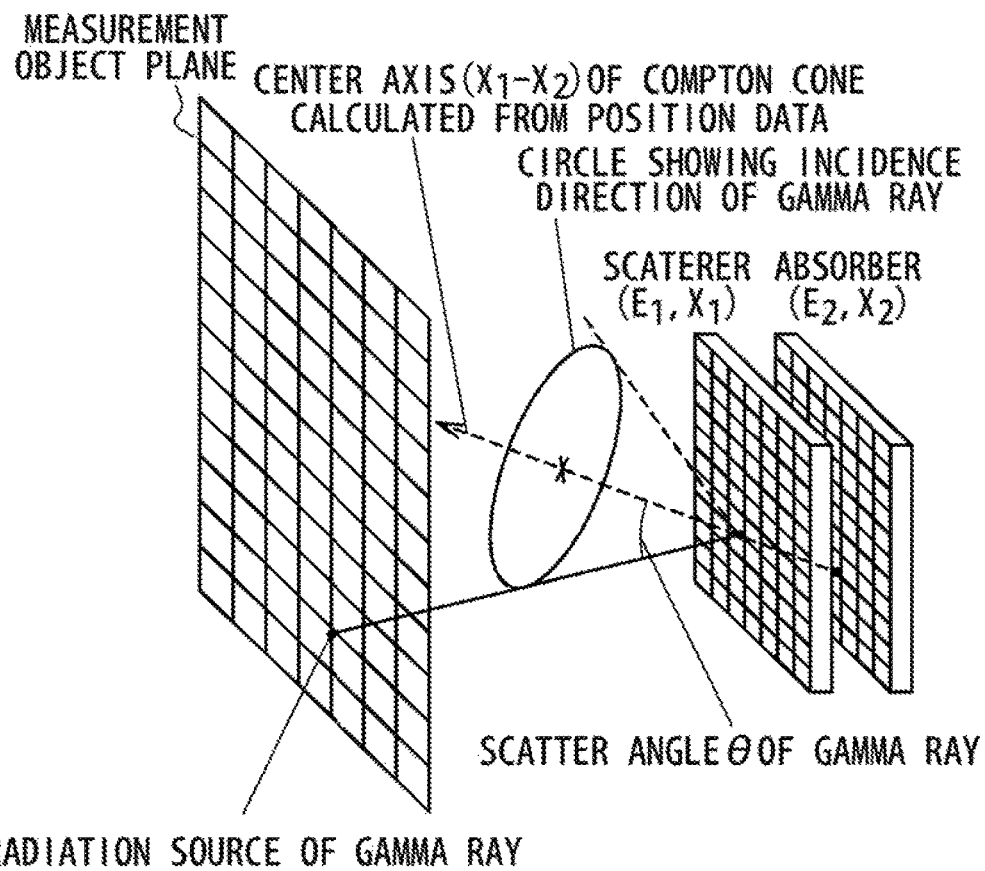
FIG. 2 is a conceptual diagram showing the principle of a Compton camera.
Figure 3:
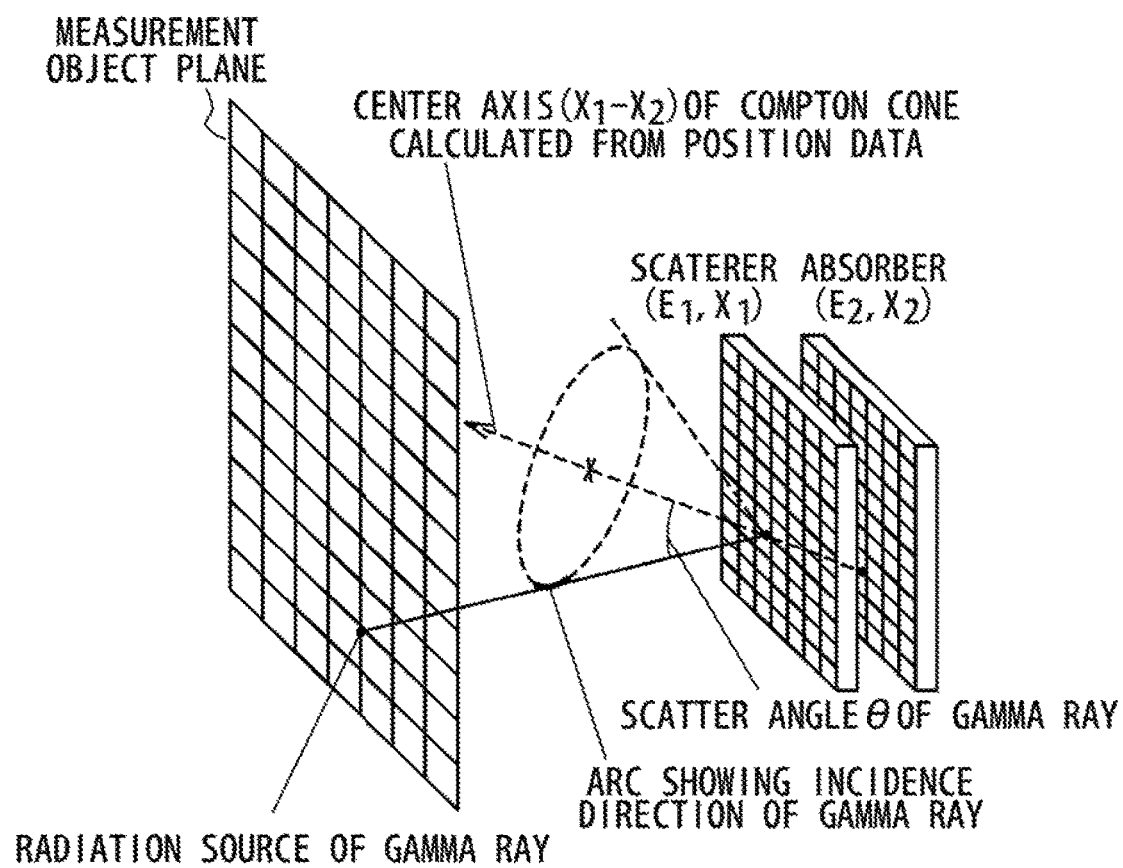
FIG. 3 is a conceptual diagram showing that an incidence direction of gamma ray can be confined based on a direction to which a recoil electron recoils.

Hereinafter, embodiments of the present invention will be described with reference to the attached drawings. Note that an identical or similar component is referred to by using an identical or corresponding reference numeral in the following description.

First Embodiment

Figure 4:
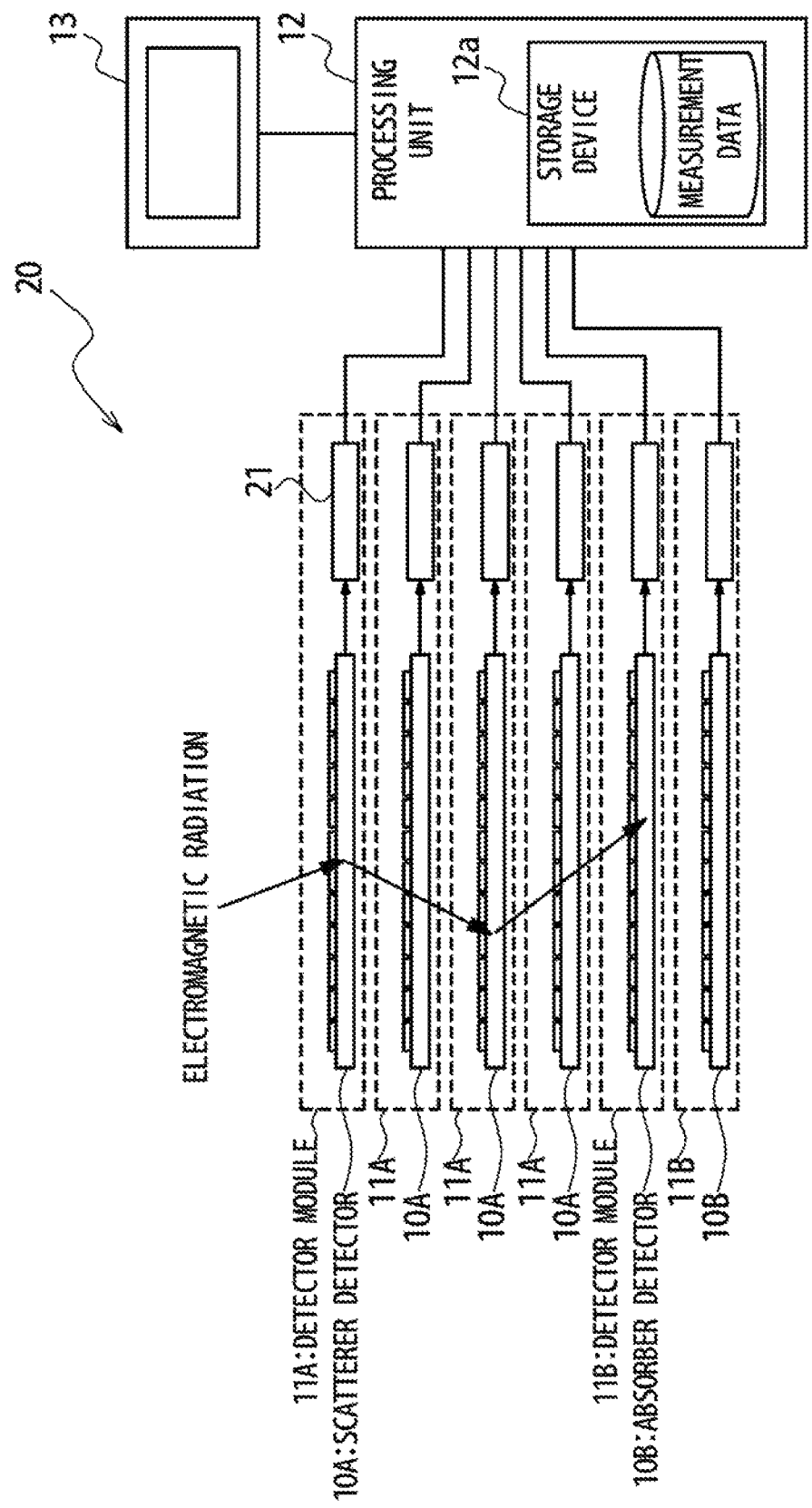
FIG. 4 is a diagram showing the configuration of Compton camera according to a first embodiment.

FIG. 4 is a block diagram showing an apparatus configuration of a Compton camera 20 in a first embodiment of the present invention. As shown in FIG. 4, the Compton camera 20 in the present embodiment includes a plurality of detector modules 11A and 11B, which are stacked, a processing unit 12 and a display device 13.

The detector module 11A is a module that includes a semiconductor detector functioning as a scatterer, and the detector module 11B is a module that includes a semiconductor detector functioning as an absorber. In the following description, the semiconductor detector functioning as the scatterer is called a scatterer detector 10A and the semiconductor detector functioning as the absorber is called an absorber detector 10B. The scatterer detector 10A and the absorber detector 10B are sometimes collectively called semiconductor detectors 10. The detector module 11A is located on the incidence side of electromagnetic radiation (e.g. gamma ray and X ray) to be measured, and the detector module 11B is located on a rear side of the detector modules 11A.

The processing unit 12 carries out data processing to measurement data obtained from an analog signal read from the scatterer detector 10A and the absorber detector 10B, to calculate a spatial distribution of radiation sources. The processing unit 12 has a storage device 12a, and stores measurement data and so on necessary for data processing in the storage device 12a. The display device 13 is used as a user interface of the Compton camera 20. For example, the display device 13 is used to display the spatial distribution of radiation sources calculated by the processing unit 12.

Figure 5:
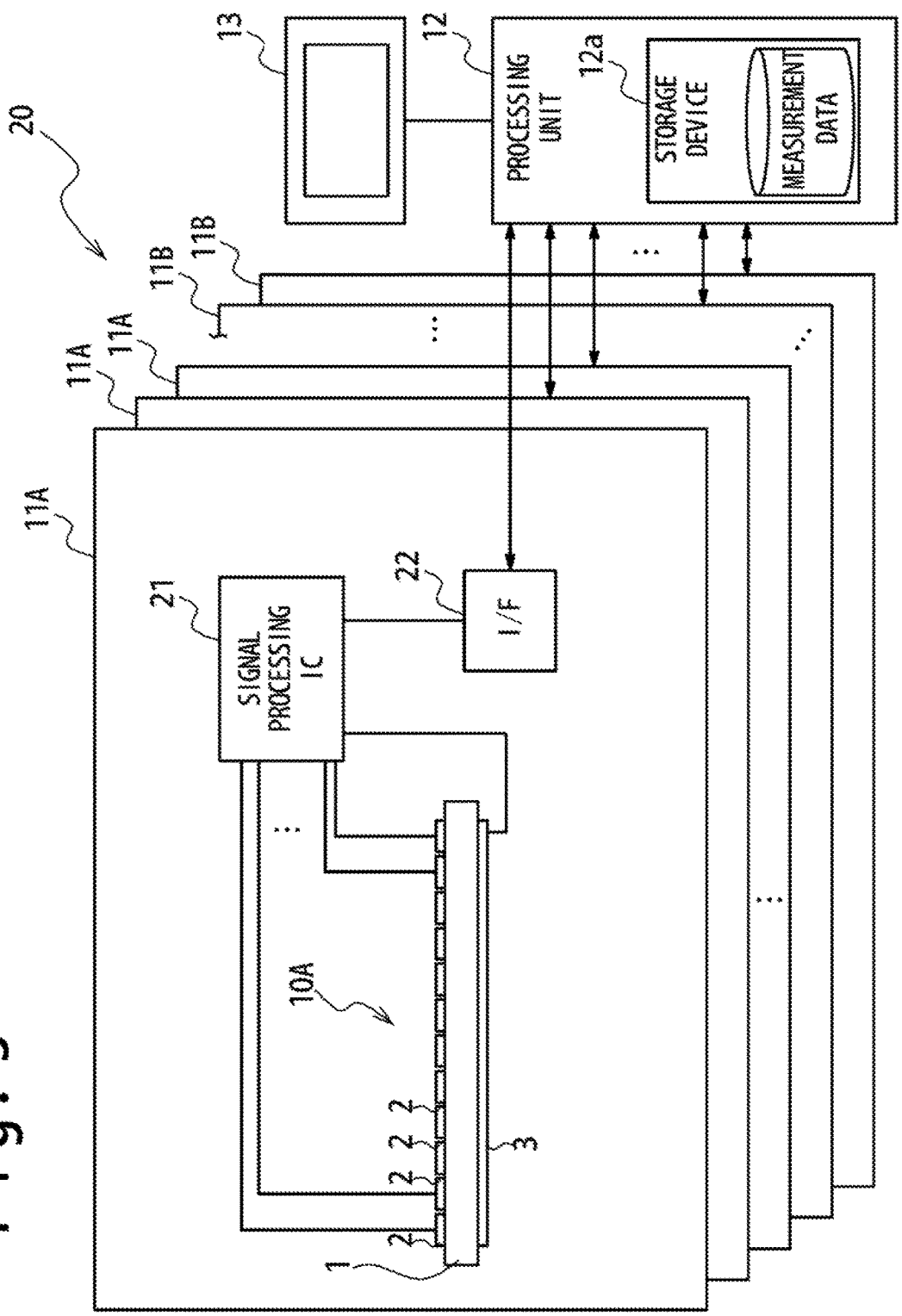
FIG. 5 is a block diagram showing an example of configuration of the detector module of Compton camera in the first embodiment.

FIG. 5 is a block diagram showing the configuration of the detector module 11A having the scatterer detector 10A. Note that the detector module 11B having the absorber detector 10B has the configuration similar to the detector module 11A except that the absorber detector 10B is substituted for the scatterer detector 10A. As shown in FIG. 5, the detector module 11A includes a signal processing IC (integrated circuit) 21 and an interface 22 in addition to the scatterer detector 10A.

Figure 6:
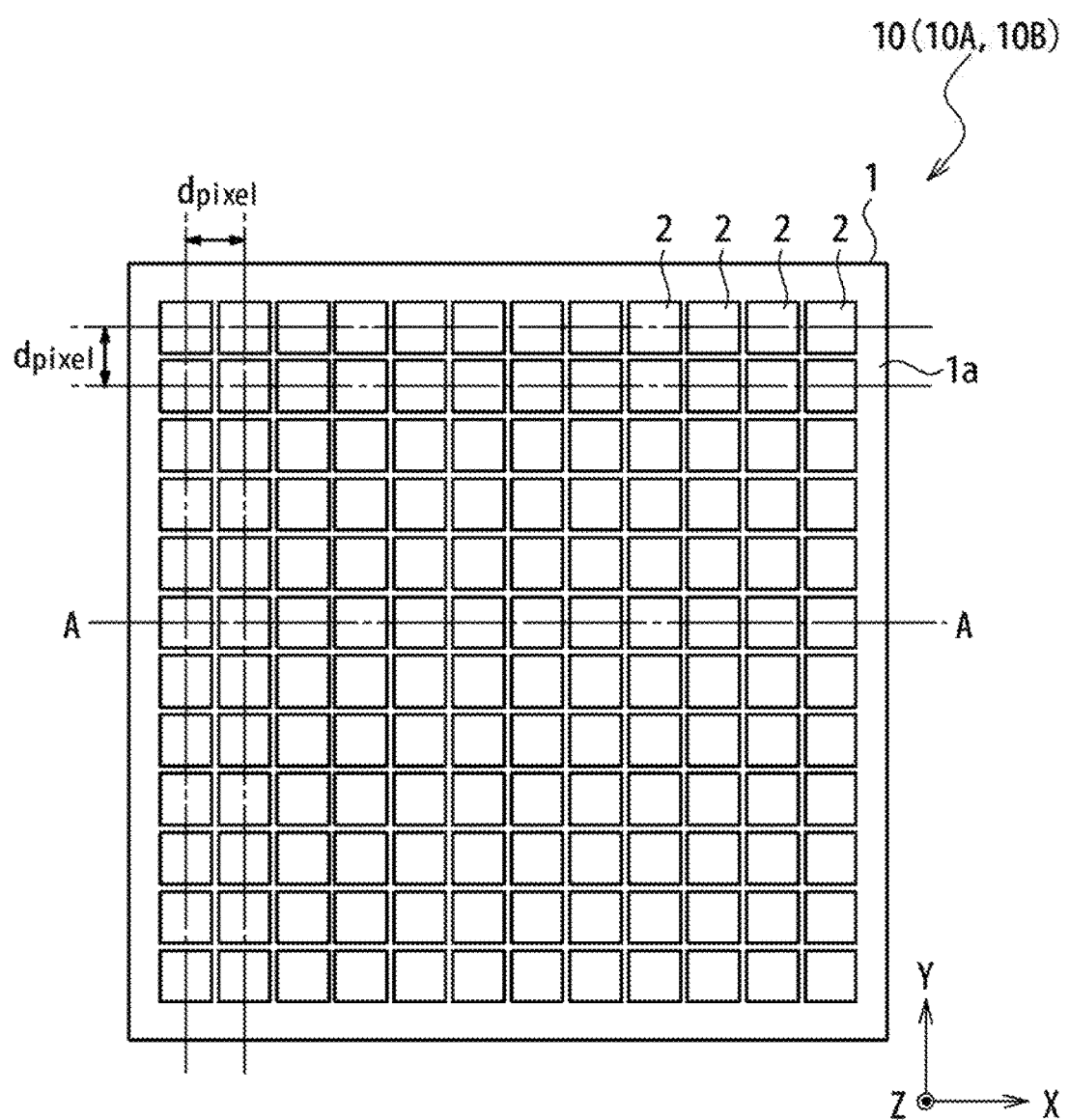
FIG. 6 is a top view showing an example of configuration of semiconductor detectors (scatterer detector and absorber detector) in the first embodiment.
Figure 7:
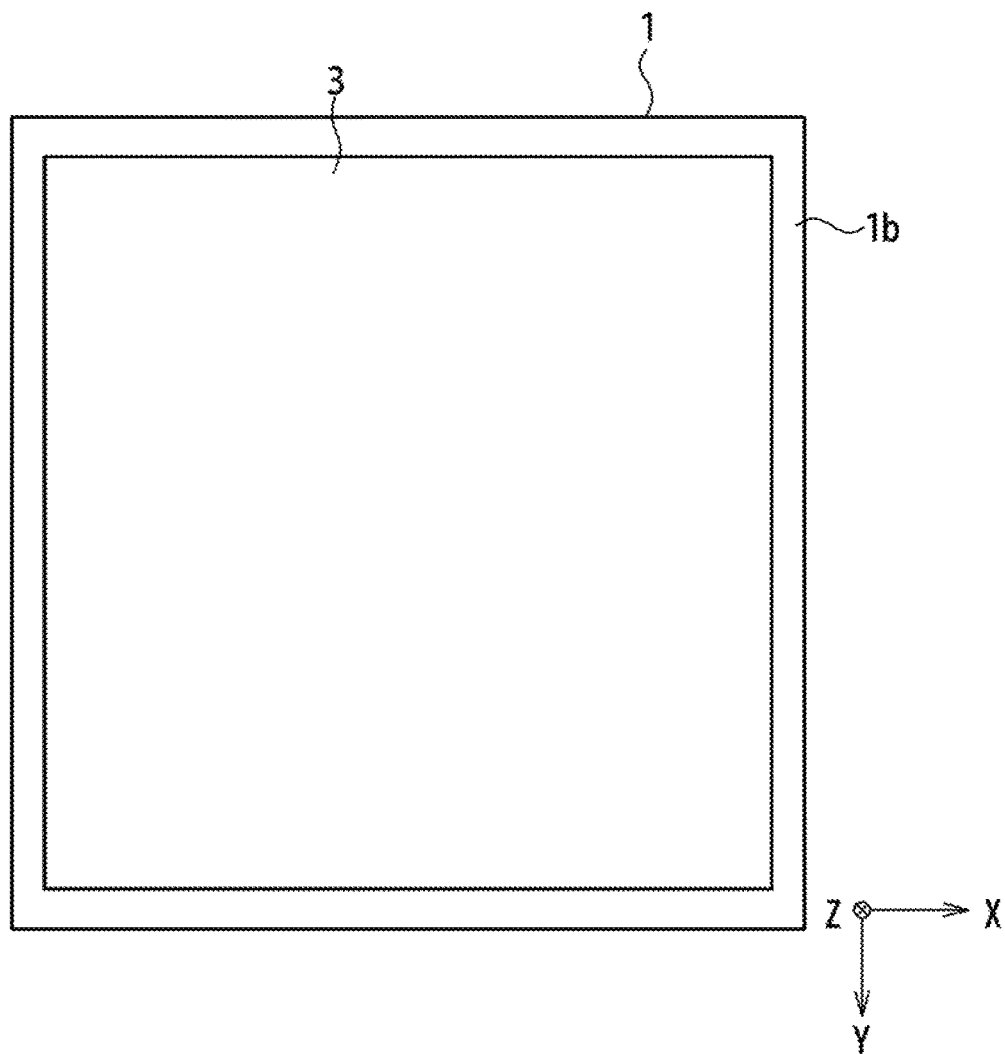
FIG. 7 is a bottom view showing an example of configuration of the semiconductor detectors in the first embodiment.
Figure 8:
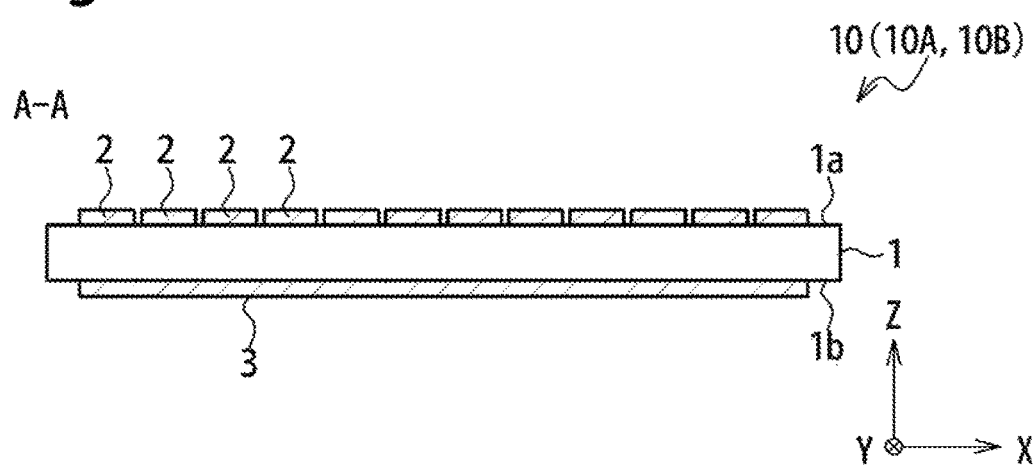
FIG. 8 is a sectional view showing an example of configuration of the semiconductor detectors in the first embodiment.

FIG. 6 to FIG. 8 are diagrams conceptually showing the configurations of the scatterer detector 10A and the absorber detector 10B in one embodiment of the present invention. In this case, FIG. 6 is a top view showing the configuration of the semiconductor detector 10, and FIG. 7 is a bottom view showing the configurations of the scatterer detector 10A and the absorber detector 10B. Also, FIG. 8 is a sectional view showing the sectional configuration of the scatterer detector 10A and the absorber detector 10B in the A-A section (see FIG. 6 and FIG. 7). Note that the description is given below, by using the XYZ rectangular coordinates system, and a direction is sometimes shown as a direction of the coordinate axis of the XYZ rectangular coordinates system.

As shown in FIG. 6 to FIG. 8, each of the scatterer detector 10A and the absorber detector 10B includes a semiconductor substrate 1. For example, the semiconductor substrate 1 is formed of semiconductor such as CdTe and silicon. In this case, in the scatterer detector 10A, the semiconductor substrate 1 is formed of material (e.g. silicon) with small atomic number so as to become easy for the Compton scattering to occur. On the other hand, in the absorber detector 10B, the semiconductor substrate 1 is formed of material (e.g. CdTe) with large atomic number. Note that in the present embodiment, the configuration of the scatterer detector 10A and the absorber detector 10B is identical except for the point that the material of the semiconductor substrate 1 is different.

A plurality of pixel electrodes 2 are formed on a front main surface 1a of the semiconductor substrate 1, and a back electrode 3 is formed on a back main surface 1b. Here, the front main surface 1a and the back main surface 1b are two surfaces having the largest area, of the surfaces of the semiconductor substrate 1, and are opposite to each other. In the present embodiment, the front main surface 1a and the back main surface 1b are parallel to the XZ plane.

As shown in FIG. 6, the pixel electrodes 2 are arranged in a matrix to configure so-called "pixel-type" detector. In the present embodiment, each of the pixel electrodes 2 is rectangular, more specifically, has a square planar shape. The back electrode 3 is provided to oppose to the plurality of pixel electrodes 2. Each of parts of the semiconductor substrate 1 that are sandwiched by each pixel electrode 2 and the back electrode 3 configures a pixel. An analog signal corresponding to a quantity of electric charges generated in each pixel is obtained from each the pixel electrode 2. The configuration in which the single back electrode 3 is provided on the back main surface 1b of the semiconductor substrate 1 is shown in FIG. 6 to FIG. 8. However, the configuration in which a plurality of back electrodes 3 are formed is possible, and will be described later in detail.

Returning to FIG. 5 again, the signal processing IC 21 operates as a signal processing section that processes the analog signal read from the pixel electrode 2 of the scatterer detector 10A or the absorber detector 10B. The signal processing IC 21 reads the analog signals at a same time from all the pixel electrodes 2 of the scatterer detector 10A or the absorber detector 10B in each frame period. The "frame period" is a period during which the analog signal is once read from each of the pixel electrodes 2 of the scatterer detector 10A or the absorber detector 10B. The each frame period is a period to read the analog signal from each pixel electrode 2. The signal processing IC 21 carries out the analog-digital conversion to the analog signal read from the pixel electrode 2 to generate measurement data showing the signal level of the analog signal. The measurement data obtained from the analog signal read from each pixel electrode 2 of the scatterer detector 10A or the absorber detector 10B is hereinafter called "pixel electrode measurement data". Each signal processing IC 21 transmits the pixel electrode measurement data generated from the scatterer detector 10A or the absorber detector 10B (more strictly, the pixel electrode measurement data generated from the analog signals read from the pixel electrodes 2 of the scatterer detector 10A or the absorber detector 10B) to the processing unit 12 through the interface 22. Moreover, the signal processing IC 21 has a function of driving the back electrodes 3 of the scatterer detector 10A or the absorber detector 10B to a desired potential.

The interface 22 has a function of exchanging data between the signal processing IC 21 and the processing unit 12. In detail, the interface 22 transfers the pixel electrode measurement data to the processing unit 12 from the signal processing IC 21. Also, the interface 22 transfers control data for controlling the signal processing IC 21 to the signal processing IC 21 from the processing unit 12.

The Compton camera 20 in the present embodiment is configured to specify the incidence direction of the electromagnetic radiation (e.g. gamma ray and X-ray) by using a recoiling direction of a recoil electron generated in the Compton scattering, that is, a direction to which the recoil electron recoils, and to calculate a spatial distribution of radiation sources. More specifically, in the Compton camera 20 of the present embodiment, from the pixel electrode measurement data obtained from the scatterer detector 10A and the absorber detector 10B, an event is extracted in which the Compton scattering has occurred in either of the scatterer detectors 10A, the recoil electron generated in the Compton scattering recoils to a direction having a component in an in-plane direction of the semiconductor substrate 1 in the inside of the scatterer detector 10A in which the Compton scattering has occurred, and the photoelectric absorption has occurred in which a photon scattered in the Compton scattering is absorbed in either of the absorber detectors 10B. Regarding such an event, the incidence direction of the electromagnetic radiation is specified by using the recoiling direction of the recoil electron and the spatial distribution of radiation sources is calculated.

When a technique of confining the incidence direction of the electromagnetic radiation by using the recoiling direction of the recoil electron is adopted, it is required to improve a spatial resolution of each scatterer detector 10A and each absorber detector 10B. To realize the spatial resolution which is required to specify the recoiling direction of the recoil electron, in the present embodiment, a pitch between the pixel electrodes 2 in each scatterer detector 10A and each absorber detector 10B, i.e. a distance between the centers of neighbor pixel electrodes 2 is controlled according to a mean free path of the recoil electron generated in the Compton scattering of the electromagnetic radiation to be measured. In FIG. 6, the pitch between the pixel electrodes 2 is shown as a symbol $d_{PIXEL}$. Here, "the center of the pixel electrode 2" means a center of gravity in the plane shape, and is equal to an intersection point of the diagonal lines when the pixel electrode 2 is rectangular (or square).

In detail, the pixel electrodes 2 of each of the scatterer detector 10A and the absorber detector 10B are arranged so that the pitch between the pixel electrodes 2 becomes smaller than the mean free path of the recoil electron. It is desirable that the pitch between the pixel electrodes 2 is sufficiently smaller than the mean free path of the recoil electron. More specifically, the pitch is desirably equal to or smaller than $\frac{1}{5}$ of the mean free path of the recoil electron, and more desirably, equal to or smaller than $\frac{1}{10}$ thereof. Here, the mean free path of the recoil electron is a parameter that is determined based on the energy of the incident electromagnetic radiation (e.g. gamma ray or X-ray). When the gamma ray with the energy of 0.3 to 2.0 MeV is measured, the mean free path of the recoil electron is in a range of 100 μm to hundreds of μm. Therefore, it is desirable that the pitch between the pixel electrodes 2 is equal to or less than 20 μm, and more desirable that the pitch is in a range of 10 μm to 20 μm.

Figure 9:
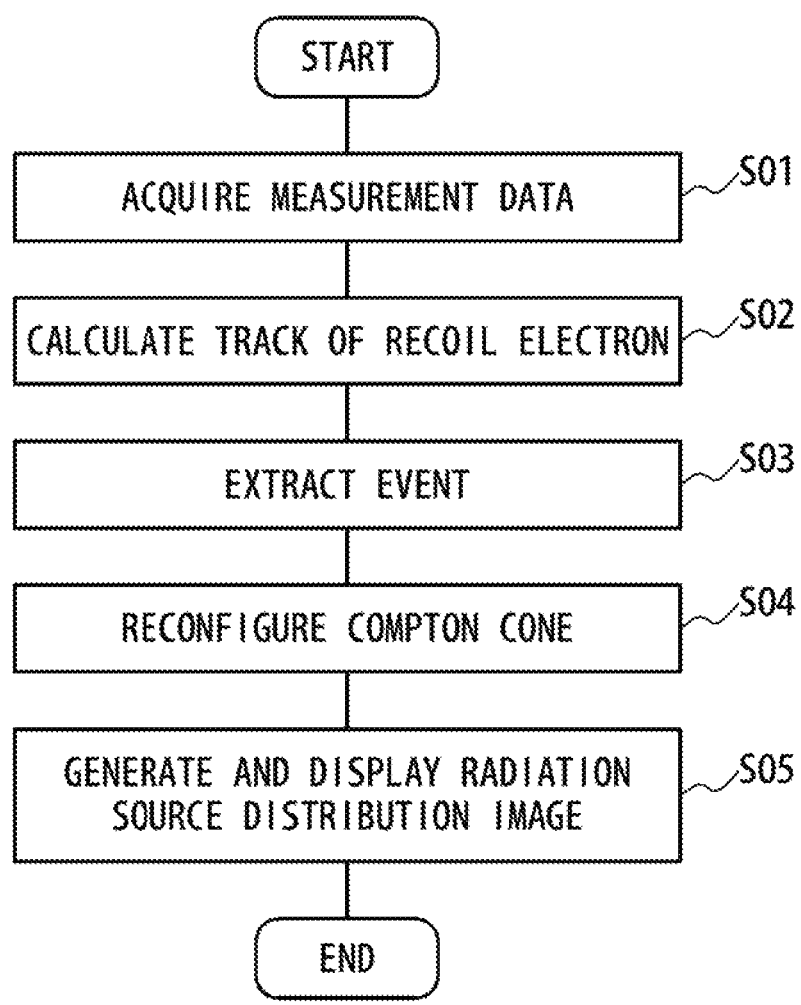
FIG. 9 is a flow chart showing an operation of Compton camera in the first embodiment.

Next, the operation of Compton camera 20 in the present embodiment will be described. FIG. 9 is a flow chart showing a procedure of calculating the spatial distribution of radiation sources in the Compton camera 20 of the present embodiment.

Step S01:

The pixel electrode measurement data are sequentially acquired from each detector modules 11A and 11B in the frame period when the electromagnetic radiation is inputted, and is stored in the storage device 12a of the processing unit 12. In detail, the pixel electrode measurement data are acquired as follows.

The signal processing IC 21 of each detector module 11A and 11B reads an analog signal from each pixel electrode 2 of the scatterer detector 10A or the absorber detector 10B in each frame period, and carries out the analog-digital conversion to the read analog signal to generate the pixel electrode measurement data. The signal processing IC 21 transfers the generated pixel electrode measurement data to the processing unit 12 through the interface 22. The pixel electrode measurement data sent from the signal processing IC 21 to the processing unit 12 are stored in the storage device 12a of the processing unit 12.

Figure 10:
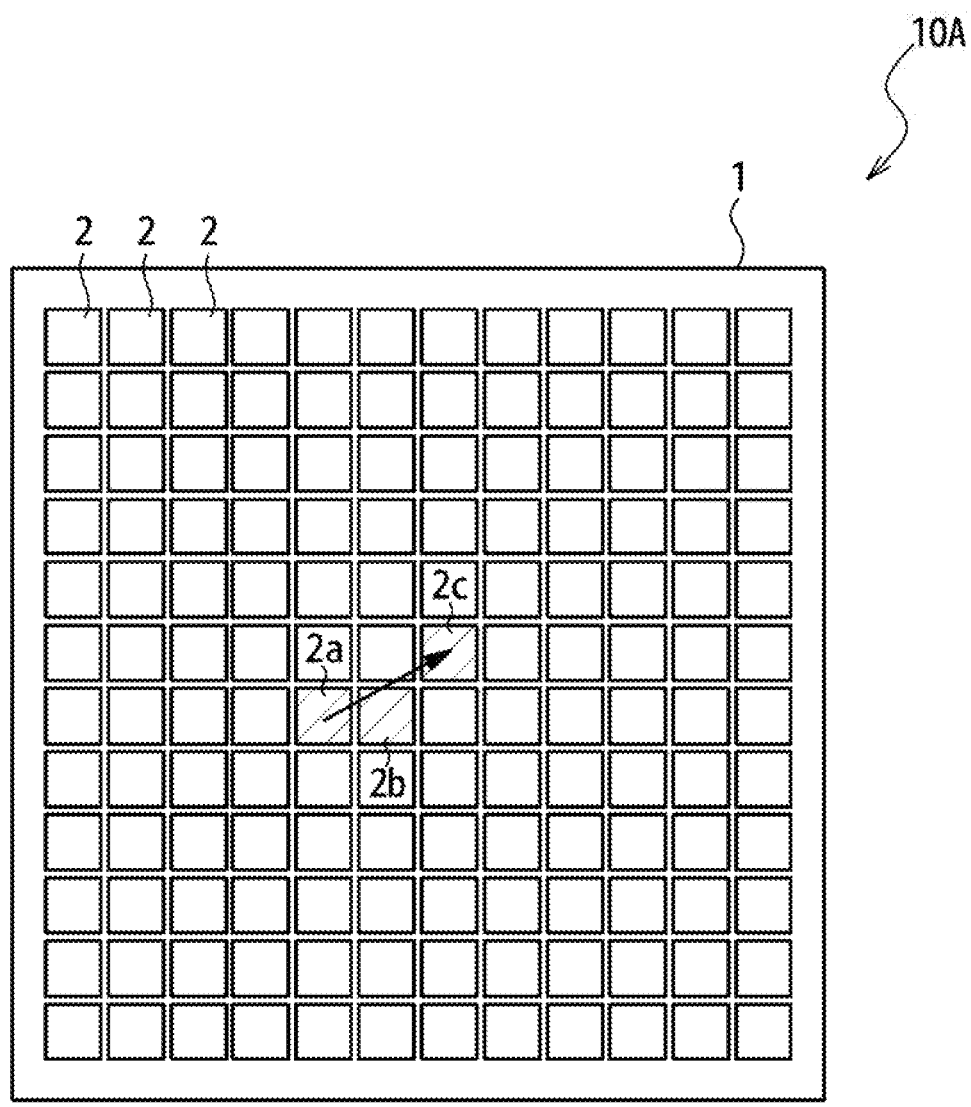
FIG. 10 is a diagram showing an example of specification of track of the recoil electron.

Step S02:

A track of the recoil electron generated in the Compton scattering is specified from the pixel electrode measurement data acquired from the detector module 11A in which the scatterer detector 10A is loaded. For example, as shown in FIG. 10, it can be detected from the pixel electrode measurement data that the recoil electron passed through pixels located continuously in the scatterer detector 10A, e.g. pixels of the pixel electrodes 2a, 2b, and 2c in a frame period. In this case, it is possible to specify when the track of the recoil electron inside the scatterer detector 10A is a track that reaches the pixel electrode 2c from the pixel electrode 2a. Also, it is possible to detect that the track of the recoil electron inside the scatter detector 10A has been stopped inside a single pixel from the pixel electrode measurement data in a frame period (for example, a case where the recoil electron recoils from the pixel outside the scatterer detector 10A).

Step S03:

An event in which the reconstruction of a Compton cone should be carried out, i.e. the incidence direction of the electromagnetic radiation should be specified is extracted from the pixel electrode measurement data which has been stored in the storage device 12a of the processing unit 12. In more detail, at step S03, an event is extracted in which:

(1) the Compton scattering of a photon of an electromagnetic radiation has occurred in a scatterer detector 10A, and then the photon scattered in the Compton scattering is absorbed through the photoelectric absorption by the absorber detector 10B, and (2) a recoiling direction of a recoil electron generated in the Compton scattering is a direction having an in-plane component of the semiconductor substrate 1 in the scatterer detector 10A.

To extract such an event, the track of the recoil electron calculated at the step S02 is referred to. For example, if the track of the recoil electron passes a plurality of continuously located pixels, it is possible to specify that the recoiling direction of the recoil electron is a direction having a component of an in-plane direction of the semiconductor substrate 1.

It is desirable from the viewpoint of easily associating the event and the pixel electrode measurement data that the track of the recoil electron calculated at the step S02 is referred to, in the extraction of the event at the step S03. At present, in a general measurement technique of the electromagnetic radiation (gamma ray, X ray and so on), there is a difficulty in associating the event and the measurement data. Especially, in the environment of electromagnetic radiations with very strong strength, because the situation occurs in which the plurality of electromagnetic radiations are incident at a same time, a problem of associating the event and the measurement data becomes serious. Therefore, in the general measurement technique of the electromagnetic radiation, the measurement of the electromagnetic radiation is stopped every time detecting the incidence of the electromagnetic radiation. That is, a trigger is generated when the incidence of the electromagnetic radiation is detected and the collection of the measurement data is temporarily stopped. After that, the measurement data are read to carry out data processing, and moreover, the collection of the measurement data is resumed after resetting a processing system of the data processing. In such a procedure, a dead time is generated (the time during which the electromagnetic radiation cannot be measured) to decline the efficiency of the measurement of the electromagnetic radiation.

On the other hand, in the present invention, it is possible to easily specify the pixel electrode measurement data corresponding to the identical event by using data of a track of the recoil electron. Therefore, the electromagnetic radiation can be measured while continuously acquiring the pixel electrode measurement data.

In addition, it is useful for the noise reduction when the Compton camera 20 is used in the environment where many neutrons are inputted, e.g. in cosmic space to refer to the track of the recoil electron. When the neutron is inputted to the scatterer detector 10A or the absorber detector 10B, no recoil electron is generated because the inputted neutron is elastically scattered with an atomic nucleus of material of the semiconductor substrate 1. Therefore, noise can be reduced by excluding events in which the track of recoil electron do not exist.

Step S04:

The reconstruction of Compton cone, i.e. the specification of the incidence direction of the electromagnetic radiation is carried out to the event extracted at the step S03. The reconstruction of Compton cone is carried out based on the pixel electrode measurement data stored in the storage device 12a of the processing unit 12. First, a position $X_1$ of occurrence of the Compton scattering in the scatterer detector 10A, energy $E_1$ acquired by the recoil electron in the Compton scattering, a position $X_2$ of occurrence of the photoelectric absorption in the absorber detector 10B, and energy $E_2$ of the photon absorbed in the photoelectric absorption are calculated in each extracted event.

Moreover, the scattering angle θ of the electromagnetic radiation in the Compton scattering is calculated to each extracted event. The calculation of the scattering angle θ of the electromagnetic radiation is carried out based on the above-mentioned equations (1) and (2) or equations equivalent to the equations (1) and (2).

The first Compton cone can be reconstructed to each event from the position $X_1$ of occurrence of the Compton scattering, energy $E_1$ acquired by the recoil electron in the Compton scattering, a position $X_2$ of occurrence of the photoelectric absorption, energy $E_2$ of the photon absorbed in the photoelectric absorption, and the scattering angle θ of the electromagnetic radiation.

Moreover, regarding the extracted event, the second Compton cone is reconstructed based on the recoiling direction of the recoil electron inside the scatterer detector 10A. Here, the recoiling direction of the recoil electron can be obtained from the track of the recoil electron calculated at the step S02. The processing unit 12 specifies the incidence direction of the electromagnetic radiation as an arc from the first Compton cone and the second Compton cone reconstructed for every event. The processing unit 12 generates incidence direction data that contains data of the incidence direction of the electromagnetic radiation specified in this way, and stores in the storage device 12a of the processing unit 12.

Step S05:

The processing unit 12 calculates a spatial distribution of radiation sources based on the incidence direction data obtained at the step S04, and moreover, generates a radiation source distribution image showing the spatial distribution of radiation sources. The processing unit 12 displays the generated radiation source distribution image on the display device 13 according to an operation by a user to a user interface of the processing unit 12.

As described above, in the Compton camera 20 of the present embodiment, the track of the recoil electron generated in the Compton scattering is calculated, and the incidence direction of the electromagnetic radiation is specified by using the recoiling direction of the recoil electron. As mentioned above, by specifying the incidence direction of the electromagnetic radiation by using the recoiling direction of the recoil electron, a range of incidence direction of the electromagnetic radiation can be confined.

Here, in the Compton camera 20 of the present embodiment, the event is extracted in which the Compton scattering has occurred in either of the scatterer detectors 10A, the recoil electron generated in the Compton scattering recoils in the inside of the scatterer detector 10A to a direction having a component of an in-plane direction of the semiconductor substrate 1, and the photoelectric absorption has occurred in which the photon scattered in the Compton scattering is absorbed by either of the absorber detectors 10B. The incidence direction of the electromagnetic radiation can be specified by carrying out data processing of the pixel electrode measurement data corresponding to the event.

In addition, in the Compton camera 20 of the present embodiment, in order to make it possible to specify of the recoiling direction of the recoil electron, a pitch between the pixel electrodes 2 of each scatterer detector 10A and each absorber detector 10B, i.e. a distance between the centers of neighbor pixel electrodes 2 is selected according to the mean free path of the recoil electron generated in the Compton scattering of the electromagnetic radiation to be measured. Thus, the spatial resolution which is necessary to specify the recoiling direction of the recoil electron can be realized in each scatterer detector 10A and each absorber detector 10B.

Second Embodiment

In the Compton camera 20 of the first embodiment, a pixel-type detector is used that includes the pixel electrodes 2 arranged in a matrix as each scatterer detector 10A and each absorber detector 10B. One problem regarding the use of pixel-type detector is in that a quantity of data to be processed by the processing unit 12 increases when increasing the number of the pixel electrodes 2. When detecting the electromagnetic radiation by using the pixel-type detector, the data obtained from each pixel electrode must be processed. However, when tire number of the pixel electrodes increases, a quantity of data to be processed increases.

Especially, in the Compton camera 20 of the first embodiment, in order to specify the track of the recoil electron (the recoiling direction of the recoil electron), the spatial resolution of each scatterer detector 10A and each absorber detector 10B must be made high. For this purpose, the number of pixel electrodes 2 must be increased. To deal with the increase of a quantity of data to be processed, the processing unit 12 with high ability must be used. However, this increases a cost. In the second embodiment, a configuration is shown that deals with the problem of increase of a quantity of data to be processed, following the increase of the number of the pixel electrodes 2 in each scatterer detector 10A and/or each absorber detector 10B.

Figure 11:
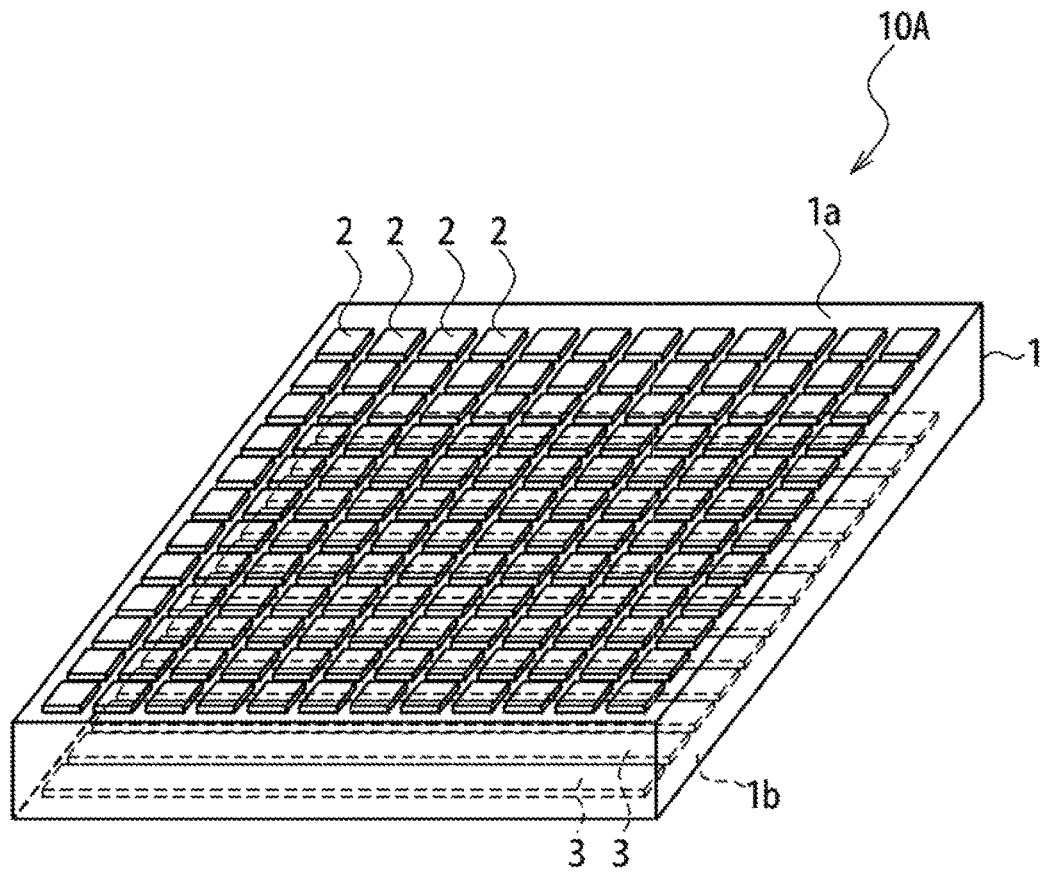
FIG. 11 is a perspective view showing the configuration of a scatterer detector in a second embodiment.
Figure 12:
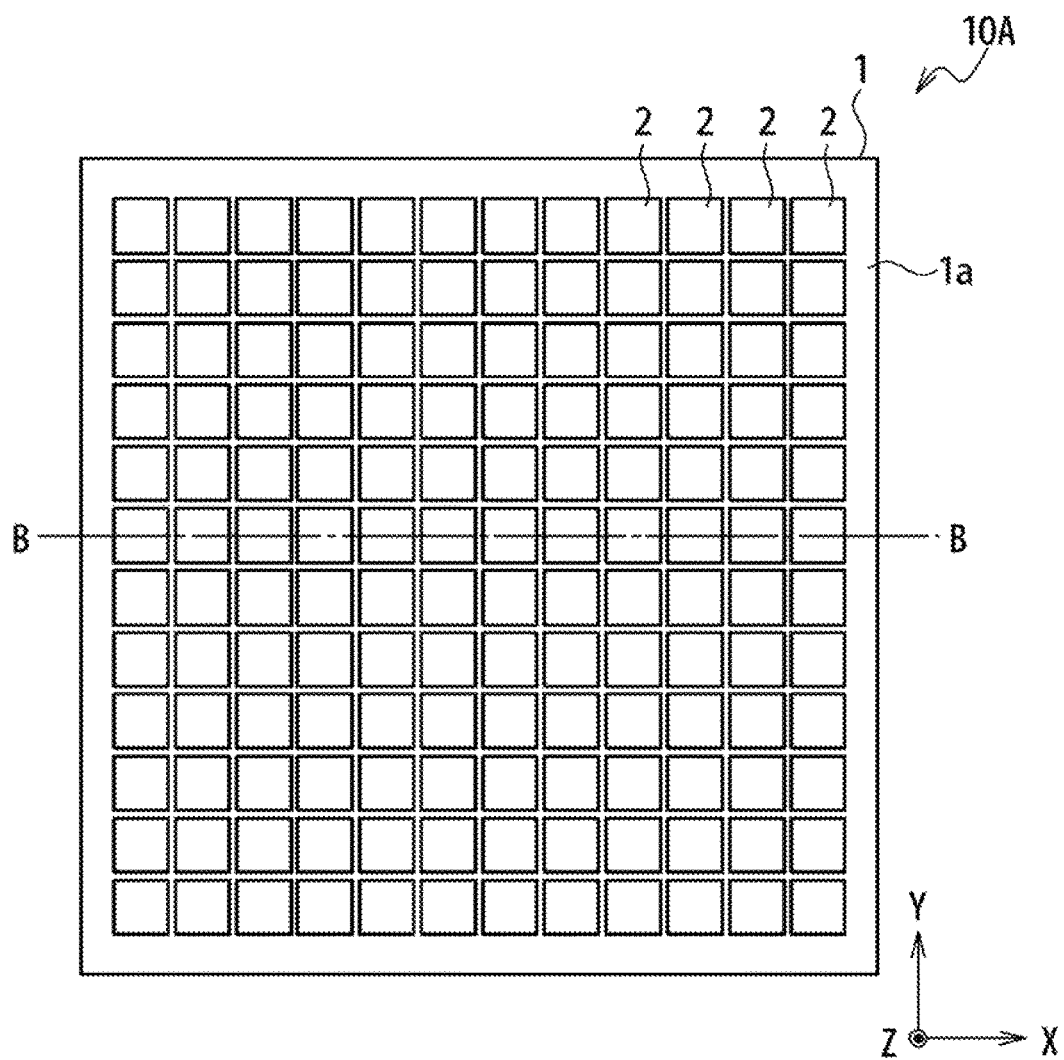
FIG. 12 is a top view showing the configuration of the scatterer detector in the second embodiment.
Figure 13:
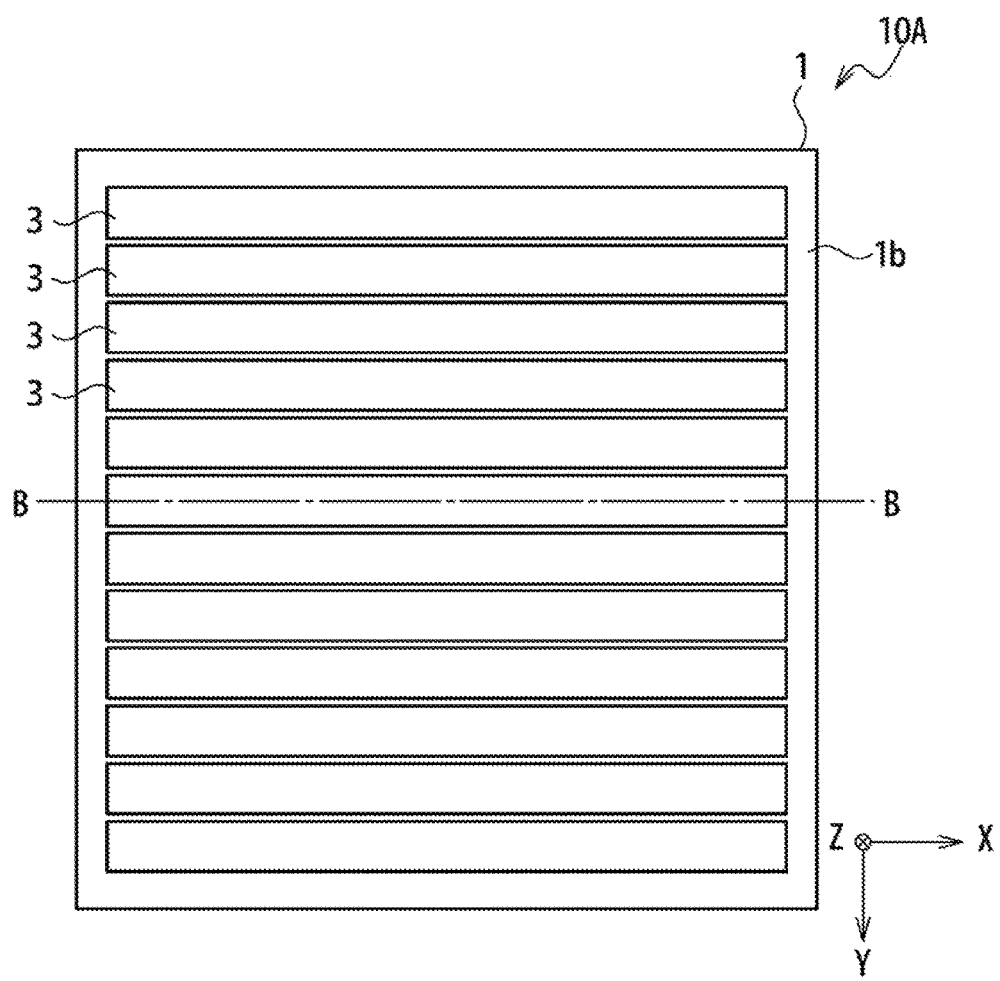
FIG. 13 is a bottom view showing the configuration of the scatterer detector in the second embodiment.
Figure 14:
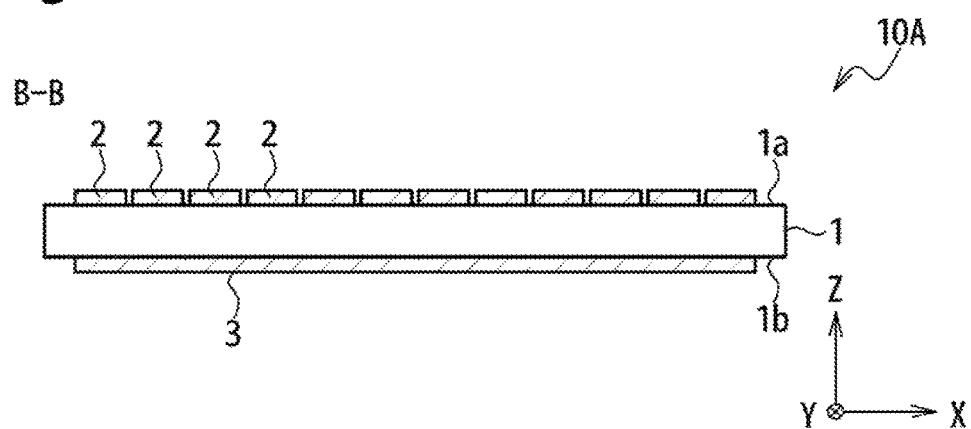
FIG. 14 is a sectional view showing the configuration of the scatterer detector in the second embodiment.

More specifically, in the second embodiment, the configuration of each scatterer detector 10A is changed. FIG. 11 to FIG. 14 are diagrams conceptually showing the configuration of each scatterer detector 10A in the second embodiment. Here, FIG. 11 is a perspective view showing the configuration of each scatterer detector 10A in the second embodiment, and FIG. 12 is a top view showing the configuration of each scatterer detector 10A. Also, FIG. 13 is a bottom view showing the configuration of each scatterer detector 10A, and FIG. 14 is a sectional view showing a section configuration in the B-B section of FIGS. 12 and 13. Note that in the following description, a direction is sometimes shown as a direction of the coordinate axis of the XYZ rectangular coordinates system.

The configuration of the scatterer detector 10A in the second embodiment is almost the same as that of the scatterer detector 10A in the first embodiment, but is different from it in that a plurality of back electrodes 3 are formed on the back main surface 1b of the semiconductor substrate 1, as shown in FIG. 11 to FIG. 13. Note that only the single back electrode 3 is provided on the back main surface 1b in the scatterer detector 10A or the first embodiment. Note that the pixel electrodes 2 are arranged in a matrix, as in the first embodiment.

More specifically, in the scatterer detector 10A of the second embodiment, the back electrode 3 is configured as a stripe type of electrode extending in the X axis direction (the first direction), and the back electrodes 3 are arranged in the Y axis direction (the second direction perpendicular to the first direction) side-by-side. Each of the back electrodes 3 is provided to oppose to a plurality of pixel electrodes 2. In the present embodiment, each of the back electrodes 3 is arranged to oppose to a plurality of pixel electrodes 2 that are arranged in a line in the X direction. Note that the number of back electrodes 3 is smaller than the number of pixel electrodes 2 because each of the back electrodes 3 is arranged to oppose to the plurality of pixel electrodes 2. Also, in the configuration of the present embodiment shown in FIG. 11 to FIG. 14, each of the pixel electrodes 2 is arranged to oppose to one of the plurality of back electrodes 3 but not to oppose to another back electrode 3. A part of the semiconductor substrate 1 sandwiched by each pixel electrode 2 and the back electrode 3 configures a pixel. An analog signal corresponding to a quantity of electric charge generated in each pixel is obtained from the pixel electrode 2.

In the scatterer detector 10A of such a configuration, it can be detected from a signal obtained from the back electrode 3 that any radiation has been inputted into either pixel, and the pixel electrode measurement data at a time when the electromagnetic radiation has been inputted into the scatterer detector 10A can be selected from the pixel electrode measurement data obtained from the pixel electrodes 2. In detail, when the electromagnetic radiation has been inputted into the pixel, electric charges are generated in the pixel, and the signals are generated in the pixel electrode 2 of the pixel and the back electrode 3 opposing to the pixel electrode 2. It can be detected from the signal generated in the back electrode 3 that any electromagnetic radiation has been inputted to either of the pixels of the plurality of pixel electrodes 2 opposing to the back electrode 3. Here, because the number of back electrodes 3 is smaller than the number of pixel electrodes 2, a calculation load to process the signal generated in the back electrode 3 can be made small, and it is easy to generate a trigger to obtain the signal from the back electrode 3. By selecting the pixel electrode measurement data at a time when any electromagnetic radiation has been inputted, from or the pixel electrode measurement data which are obtained from the pixel electrodes 2 of the scatterer detector 10A based on the signal obtained from the back electrode 3, and by analyzing the selected pixel electrode measurement data to detect the radiation, a quantity of the pixel electrode measurement data to be processed can be reduced.

In the configuration shown in FIG. 11 to FIG. 14, the configuration is shown that has the striped-type back electrodes 3. However, if each of the back electrodes 3 is arranged to oppose to the plurality of pixel electrodes 2 and the number of back electrodes 3 is less than the number of pixel electrodes 2, the arrangement of the back electrodes 3 may be variously changed.

Figure 15:
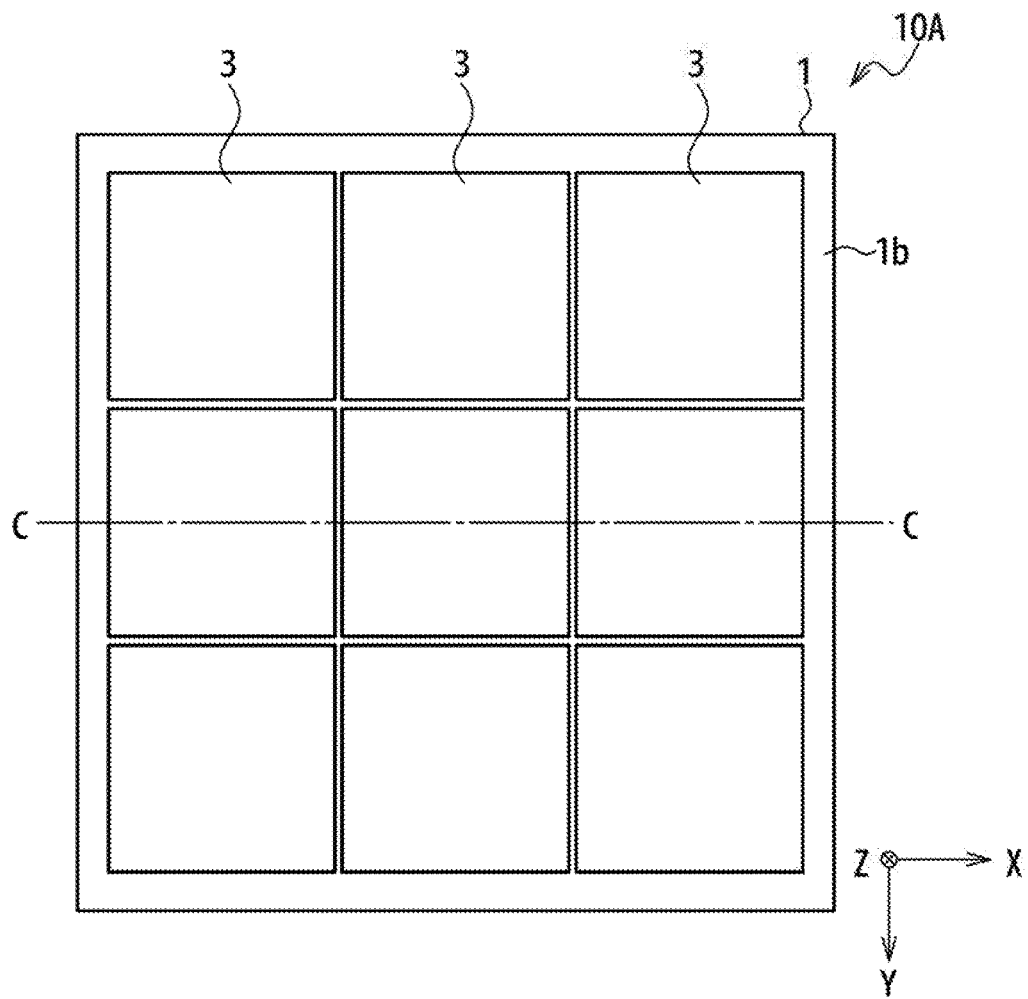
FIG. 15 is a bottom view showing a modification example of the configuration of the scatterer detector in the second embodiment.
Figure 16:
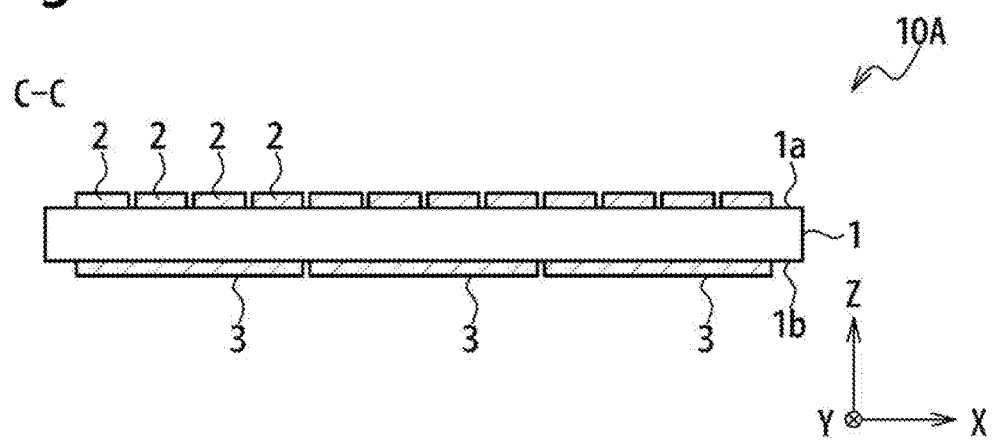
FIG. 16 is the section showing a modification example of the configuration of the scatterer detector in the second embodiment.

FIG. 15 and FIG. 16 show the configuration of the scatterer detector 10A in which the arrangement of back electrodes 3 is different. Here, FIG. 15 is a bottom view showing the configuration of the scatterer detector 10A, and FIG. 16 is a sectional view of the scatterer detector 10A in the C-C section shown in FIG. 15.

In the configuration shown in FIG. 15 and FIG. 16, the back electrodes 3 are arranged in a matrix (3 rows 3 columns in an example of FIG. 15). Here, each of the back electrodes 3 is arranged to oppose to the pixel electrodes 2 arranged in a 4×4 matrix. In this case, note that each of the pixel electrodes 2 opposes to one of the plurality of back electrodes 3 but does not oppose to another back electrode 3.

Even in such a configuration, by using the signal obtained from the back electrode 3, the pixel electrode measurement data obtained from the pixel electrode 2 in a position where the electromagnetic radiation has been inputted to the scatterer detector 10A and the Pixel electrodes 2 in the neighborhood of the position can be selected from the pixel electrode measurement data obtained from all the pixel electrodes 2. Here, as shown in FIG. 11 to FIG. 14, it is easy to acquire the signal from the back electrode 3 in the configuration using the striped-type back electrodes 3. Thus, it is desirable to use the striped-type back electrodes 3.

Figure 17:
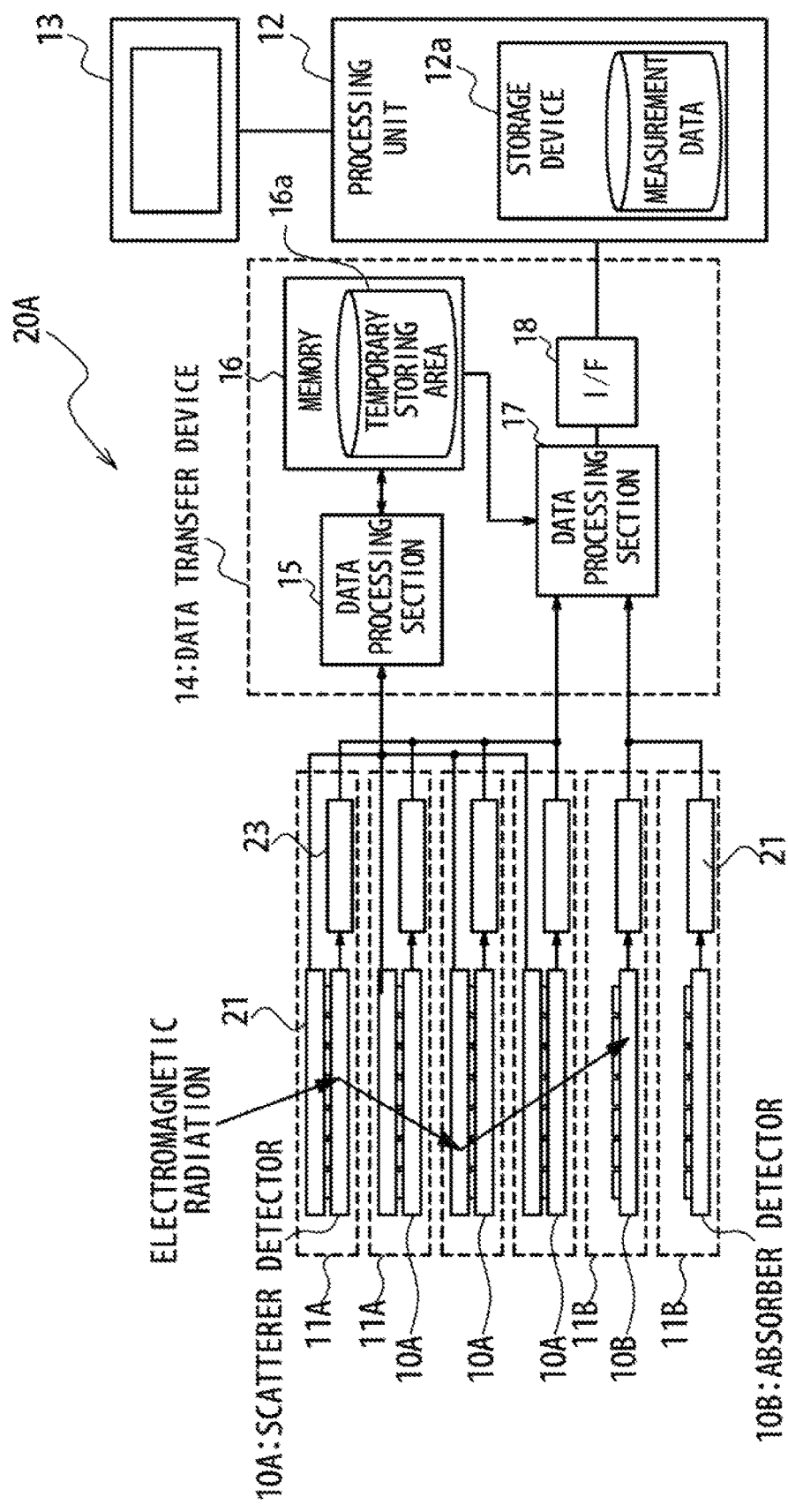
FIG. 17 is a block diagram showing an example of configuration of the Compton camera in the second embodiment.

FIG. 17 is a block diagram showing an example of configuration of a Compton camera 20A of the second embodiment using the above-mentioned scatterer detector 10A. The configuration of the Compton camera 20A in the second embodiment is similar to that of the Compton camera 20 in the first embodiment. The Compton camera 20A of the second embodiment includes the plurality of detector modules 11A and 11B, the processing unit 12 and the display device 13, like the Compton camera 20 in the first embodiment. Here, in the Compton camera 20A of the second embodiment, the configuration of the detector module 11A loaded with the scatterer detectors 10A is changed following a change of the configuration of the scatterer detector 10A, and moreover, a data transfer device 14 is provided. The data transfer device 14 has a function of temporarily storing the pixel electrode measurement data obtained from the pixel electrodes 2 of the scatterer detector 10A, and selectively transferring the effective pixel electrode measurement data of the stored pixel electrode measurement data to the processing unit 12 (that is, the pixel electrode measurement data used to calculate the spatial distribution of radiation sources), as mentioned later.

Figure 18:
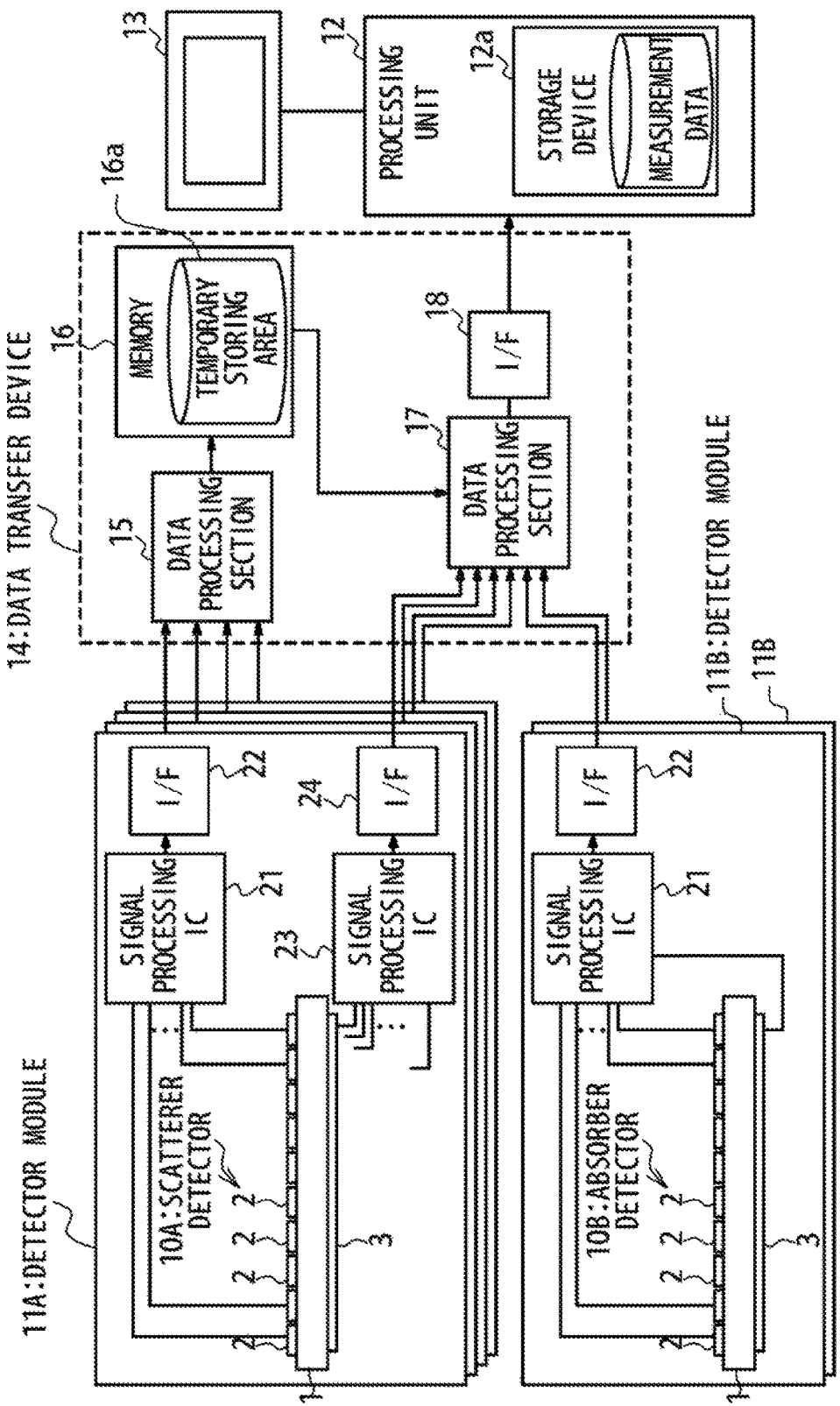
FIG. 18 is a block diagram showing an example of the configuration of a detector module of Compton camera in the second embodiment.

FIG. 18 is a block diagram showing the configuration of the detector modules 11A having the scatterer detectors 10A and the detector modules 11B having the absorber detectors 10B and the configuration of data transfer device 14 in the second embodiment.

The detector module 11A in the second embodiment includes signal processing ICs 21 and 23 and interfaces 22 and 24. The signal processing IC 21 functions as a signal processing section that processes the analog signal read from each pixel electrode 2 of the scatterer detector 10A. In detail, the signal processing IC 21 reads the analog signals at the same time from all the pixel electrodes 2 of the scatterer detector 10A in each frame period, carries out analog-digital conversion to the read analog signals and generates the pixel electrode measurement data showing the signal level of the analog signal. The signal processing IC 21 transmits the generated pixel electrode measurement data to the data transfer device 14 through the interface 22.

On the other hand, the signal processing IC 23 functions as a signal processing section that processes the analog signal react from each back electrode 3 of the scatterer detector 10A. In detail, the signal processing IC 23 carries oat analog-digital conversion to the analog signal read from each back electrode 3, and generates the measurement data showing a signal level of the analog signal. The measurement data obtained from the analog signal read from each back electrode 3 are hereinafter called a "back electrode measurement data". The signal processing IC 23 transmits the generated back electrode measurement data to the data transfer device 14 through the interface 24. The back electrode measurement data obtained in each detector module 11A are used in the data transfer device 14 to select the pixel electrode measurement data to be finally transferred to the processing unit 12, as mentioned later.

Assuming that the configuration of the absorber detector 10B and that of the detector module 11B are same as those of the first embodiment (that is, the absorber detector 10B has the single back electrode 3), the description is given. However, the absorber detector 10B is possible to have a plurality of back electrodes 3 in she same way as the scatterer detector 10A (such a modification example will be described later).

The data transfer device 14 has a function of transferring the pixel electrode measurement data and the back electrode measurement data obtained from each scatterer detector 10A, and the pixel electrode measurement data obtained from each absorber detector 10B to the processing unit 12. In this case, the data transfer device 14 is configured to select the pixel electrode measurement data necessary to measure an electromagnetic radiation (e.g. the pixel electrode measurement data corresponding to the time when the electromagnetic radiation is inputted) from the pixel electrode measurement data obtained from each scatterer detector 10A to transfer to the processing unit 12. This selection is carried out based on the back electrode measurement data obtained from each scatterer detector 10A and the pixel electrode measurement data obtained from each absorber detector 10B. Since only the selected pixel electrode measurement data are sent to the processing unit 12, the quantity of pixel electrode measurement data to be processed by the processing unit 12 can be reduced.

In detail, the data transfer device 14 includes a data p routes sing section 15, a memory 16, a data processing section 17 and an interface 18. The data processing section 15, the memory 16, the data processing section 17, and the interface 18 may be implemented as the integrated circuits (IC), respectively. Also, some of the data processing section 15, the memory 16, the data processing section 17, and the interface 18 may be realized by an integrated circuit that is monolithically integrated.

The data processing section 15 receives the pixel electrode measurement data obtained in each scatterer detector 10A from a corresponding detector module 11A to store in the memory 16. At this time, the data processing section 15 generates time data in synchronization with generation of the pixel electrode measurement data (that is, the time data of the contents synchronizing with the time when the pixel electrode measurement data are generated), and the generated time data are stored in the memory 16 together with the pixel electrode measurement data. In the present embodiment, the time data showing the time when data processing section 15 receives the pixel electrode measurement data from the detector module 11A is stored in the memory 16 together with the pixel electrode measurement data. The memory 16 provides tire temporary storing area 16a to temporarily store the pixel electrode measurement data obtained from each scatterer detector 10A and the time data corresponding to the pixel electrode measurement data.

The data processing section 17 processes the back electrode measurement data obtained from each scatterer detector 10A and the pixel electrode measurement data obtained from each absorber detector 10B. In detail, the data processing section 17 generates the time data in synchronization with the generation of the back electrode measurement data obtained from each scatterer detector 10A (that is, the time data having the content which is synchronized with the time when the back electrode measurement data is generated), and generates the time data in synchronization with the generation of the pixel electrode measurement data obtained from each absorber detector 10B (that is, the time data having the content which is synchronized with the time when the pixel electrode measurement data are generated). In the present embodiment, the time data corresponding to the back electrode measurement data obtained from the scatterer detector 10A are generated to show the time when the data processing section 17 receives the back electrode measurement data from each scatterer detector 10A, and the time data corresponding to the pixel electrode measurement data obtained from the absorber detector 10B are generated to show the time when the data processing section 17 receives the pixel electrode measurement data from each absorber detector 10B. Moreover, the data processing section 17 determines whether or not the pixel electrode measurement data and the back electrode measurement data obtained from each scatterer detector 10A in each frame period and the pixel electrode measurement data obtained from each absorber detector 10B in the frame period should foe transferred to the processing unit 12. This determination is carried cat based on the back electrode measurement data obtained from each scatterer detector 10A and the pixel electrode measurement data obtained from each absorber detector 10B. When determining to be transmitted, the data processing section 17 transfers the pixel electrode measurement, data and the back electrode measurement data obtained from each scatterer detector 10A and the pixel electrode measurement data obtained from each absorber detector 10B to the processing unit 12. In this transfer, the data processing section 17 transfers the pixel electrode measurement data and the back electrode measurement data obtained from each scatterer detector 10A and the pixel electrode measurement data obtained from each absorber detector 10B to the processing unit 12 along with the time data corresponding to these data. The pixel electrode measurement data, the back electrode measurement data and the time data corresponding to them which have been transferred to the processing unit 12 are stored in the storage device 12a and are used to specify the incidence direction of electromagnetic radiation and to calculate the spatial distribution of radiation sources.

More specifically, when the back electrode measurement data obtained from each scatterer detector 10A and the pixel electrode measurement data obtained from each absorber detector 10B in a frame period meet a predetermined condition (to be sometimes referred to as a "data acquisition condition" below), the data processing section 17 transfers the pixel electrode measurement data and the back electrode measurement data obtained from each scatterer detector 10A in the frame period, and the pixel electrode measurement data obtained from each absorber detector 10B in the frame period, and the time data corresponding to them, to the processing unit 12. Here, note that the pixel electrode measurement data obtained from each scatterer detector 10A are stored in the temporary storing area 16a of the memory 16, together with the time data. The data processing section 17 refers to the time data to select the pixel electrode measurement data and the corresponding time data, corresponding to the frame period during which the data acquisition condition is met, from the pixel electrode measurement data obtained from each scatterer detector 10A, and to read from the temporary storing area 16a, and transmits the pixel electrode measurement data and the time data read from the temporary storing area, to the processing unit 12. The transfer of the pixel electrode measurement data, the back electrode measurement data and the time data to the processing unit 12 is carried out through the interface 18.

For example, when it is determined from the back electrode measurement data obtained from each scatterer detector 10A and the pixel electrode measurement data obtained from each absorber detector 10B in a frame period that an electromagnetic radiation has inputted to either of the scatterer detector 10A or the absorber detector 10B in the frame period, the pixel electrode measurement data and the back electrode measurement data obtained from each scatterer detector 10A in the frame period and the pixel electrode measurement data obtained from each absorber detector 10B in the frame period may be transferred to the processing unit 12. At this time, regarding the pixel electrode measurement data obtained from each scatterer detector 10A, the pixel electrode measurement data corresponding to the frame period which meets the data acquisition condition are selected while referring to the time data, and the selected pixel electrode measurement data are transferred to the processing unit 12. As another example, when it is determined from the back electrode measurement data obtained from each scatterer detector 10A and the pixel electrode measurement data obtained from each absorber detector 10B in a frame period that an electromagnetic radiation has inputted to one scatterer detector 10A and one absorber detector 10B (it is supposed that the Compton scattering has occurred in the one scatterer detector 10A and the photoelectric absorption has occurred in the one absorber detector 10B), the pixel electrode measurement data and the back electrode measurement data obtained from each scatterer detector 10A in the frame period and the pixel electrode measurement data obtained from each absorber detector 10B in the frame period may be transferred to the processing unit 12. In this case, the pixel electrode measurement data corresponding to the frame period which meets the data acquisition condition are selected from the pixel electrode measurement data obtained from each scatterer detector 10A while referring to the time data, and the selected pixel electrode measurement data are read from the temporary storing area 16a and are transferred to the processing unit 12, in the same way as mentioned above.

The processing unit 12 carries out data processing to the pixel electrode measurement data and the back electrode measurement data which are transferred from the data transfer device 14 and calculates a spatial distribution of radiation sources. For example, the processing unit 12 calculates a position $X_1$ of occurrence of the Compton scattering, energy $E_1$ acquired by the recoil electron in the Compton scattering, a track of the recoil electron (i.e. a recoiling direction), a position $X_2$ of occurrence of the photoelectric absorption, energy $E_2$ of a photon absorbed in the photoelectric absorption, and a scattering angle $\theta$ of the electromagnetic radiation, from the pixel electrode measurement data obtained from the scatterer detector 10A in a frame period and the pixel electrode measurement data obtained from the absorber detector 10B in the frame period. The processing unit 12 further calculates the incidence direction of the electromagnetic radiation and the spatial distribution of radiation sources from these data. At this time, the processing unit 12 may improve calculation precision of the energy $E_1$ acquired by the recoil electron in the Compton scattering by referring to the back electrode measurement data obtained from the scatterer detector 10A.

Figure 19:
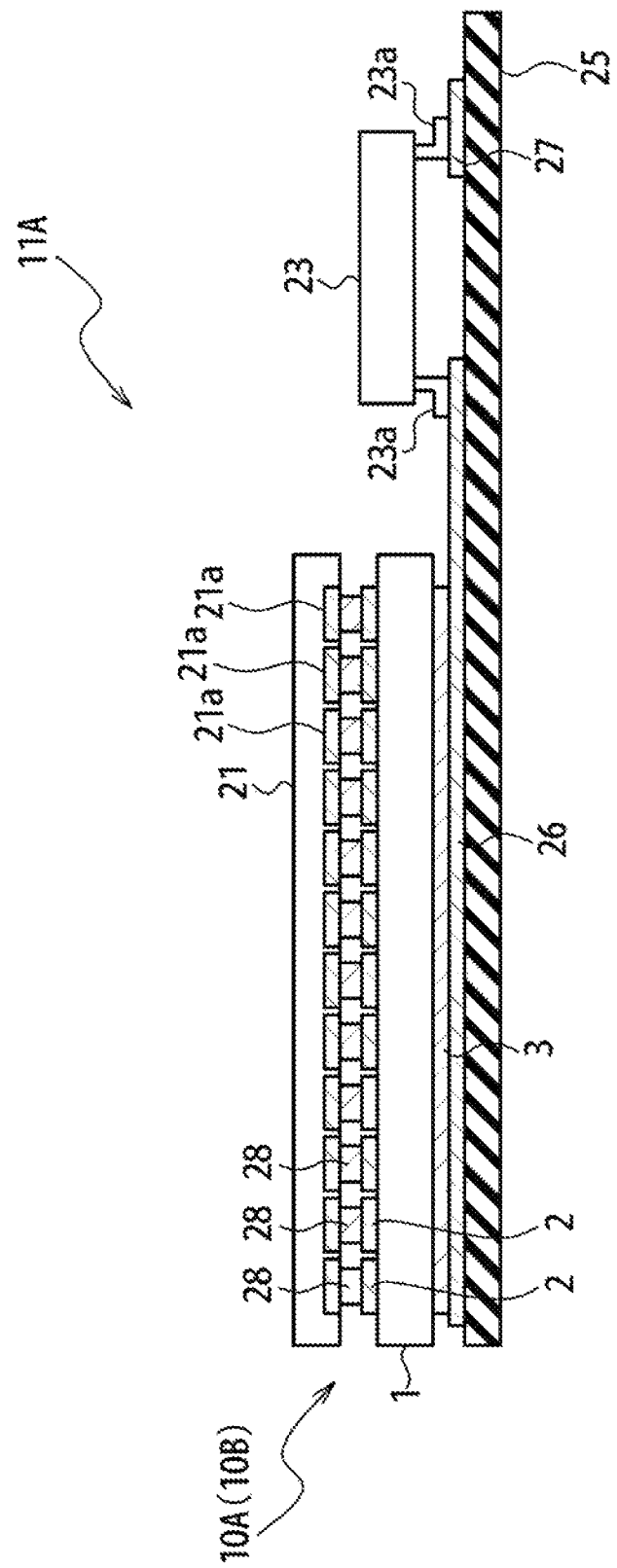
FIG. 19 is a sectional view showing an example of implementation of the scatterer detector in the detector module.

FIG. 19 is a sectional view showing an example of implementation of the scatterer detector 10A of the detector module 11A. In one embodiment, the detector module 11A includes a printed circuit board 25. The scatterer detector 10A and the signal processing IC 23 are connected to wiring pattern lines formed on the printed circuit board 25. In detail, the scatterer detector 10A is connected to a wiring pattern line 26 formed on the printed circuit board 25. Here, the wiring pattern line 26 is a wiring line to electrically connect the back electrode 3 of the scatterer detector 10A and the signal processing IC 23. That is, the back electrode 3 of the scatterer detector 10A is connected to the wiring pattern line 26. On the other hand, the signal processing IC 23 is connected to wiring pattern lines 26 and 27. Here, the wiring pattern line 27 is a wiring line to electrically connect the signal processing IC 23 and the interface 22.

On the other hand, the pixel electrodes 2 of the scatterer detector 10A and the signal processing IC 21 are connected by a flip chip connection. In detail, the signal processing IC 21 has pads 21a and bumps 28 are connected to the pads 21a. The bumps 28 are connected to the pixel electrodes 2 of the scatterer detector 10. The analog signal generated by each pixel electrode 2 is read into the pad 21a of the signal processing IC 21 through the bump 28. In the Compton camera 20A of the present embodiment, the plurality of pixel electrodes 2 are connected with the signal processing IC 21 in parallel by such a configuration. It is effective for the improvement of time resolution that the plurality of pixel electrodes 2 are connected with the signal processing IC 21 in parallel.

Note that in FIG. 19, the interfaces 22 and 24 are not shown but the interfaces 22 and 24 may be mounted on the printed circuit board 25.

Next, the operation of the Compton camera 20A in the present embodiment will be described. A procedure of calculating the spatial distribution of radiation sources in the Compton camera 20A of the present embodiment is almost the same as in the Compton camera 20 in the first embodiment (see FIG. 9). The measurement data (the pixel electrode measurement data and the back electrode measurement data) are acquired (Step S01), and a track of the recoil electron is calculated (Step S02). An event is extracted by using the track of recoil electron calculated at the step S02 (Step S03), and the reconstruction of a Compton cone, i.e. the incidence direction of the electromagnetic radiation is specified for the extracted event (Step S04). Moreover, the spatial distribution of radiation sources is calculated by using the incidence direction of the specified electromagnetic radiation.

The generation and display of the radiation source distribution image showing the spatial distribution of radiation sources are carried out (Step S05).

Here, in the Compton camera 20A of the second embodiment, when the back electrode measurement data obtained from each scatterer detector 10A and the pixel electrode measurement data obtained from each absorber detector 10B in each frame period in the acquisition of the measurement data (step S01) meet a predetermined data acquisition condition, the pixel electrode measurement data and the back electrode measurement data obtained from each scatterer detector 10A in the frame period, the pixel electrode measurement data obtained from each absorber detector 10B in each frame period, and the time data corresponding to them are transferred to the processing unit 12. In this point, the Compton camera 20A in the second embodiment differs from the Compton camera 20 in the first embodiment. By such an operation, in the second embodiment, necessary data of the pixel electrode measurement data obtained from each scatterer detector 10A are selectively transferred to the processing unit 12. Thus, the data quantity of the pixel electrode measurement data to be processed by the processing unit 12 can be reduced.

Figure 20:
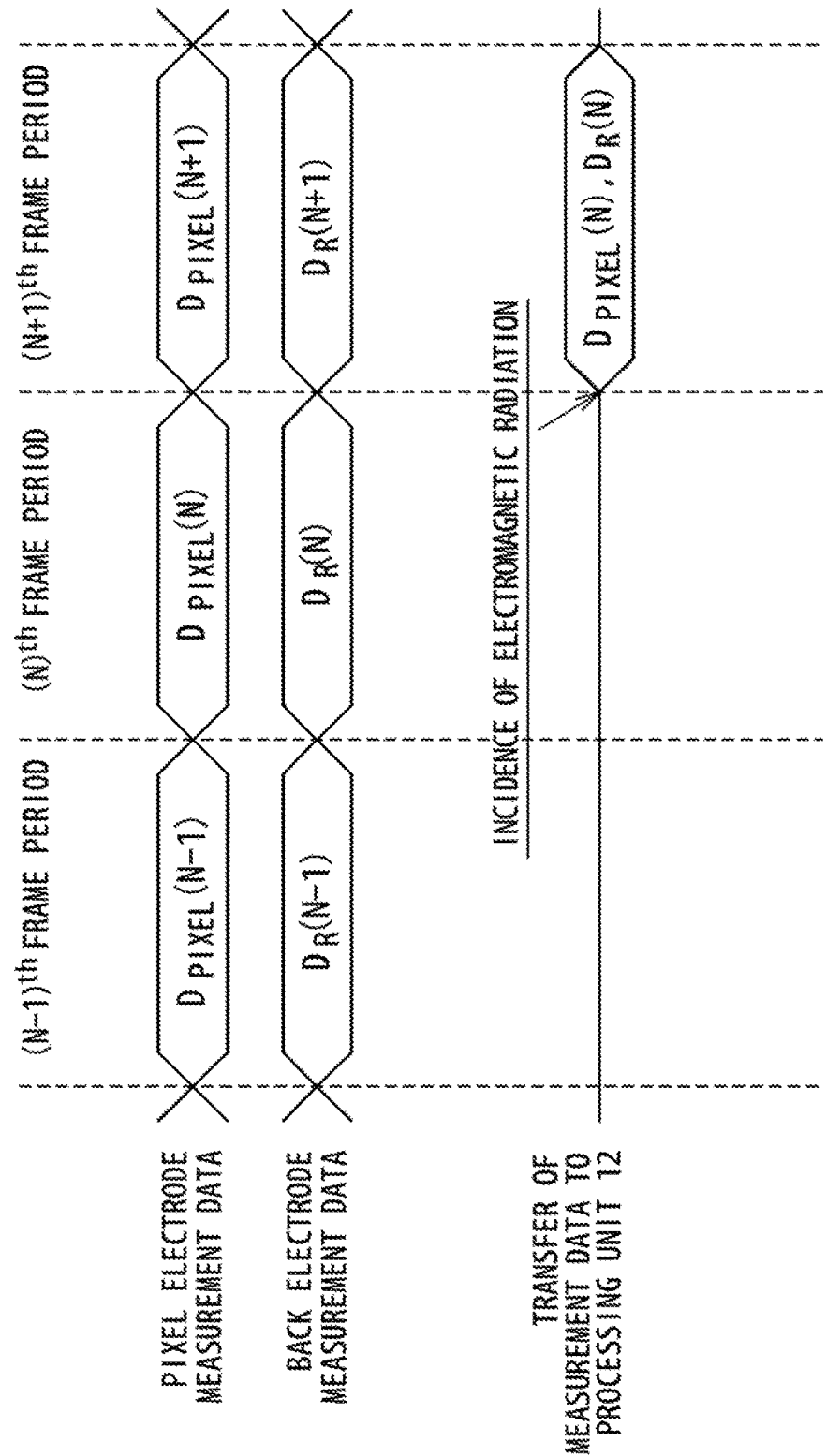
FIG. 20 is a timing chart showing an operation of the acquisition of measurement data in the second embodiment.

FIG. 20 is a timing chart showing the operation of acquisition of the measurement data in the present embodiment. The operation in the $(N-1)^{th}$ to the $(N+1)^{th}$ frame periods is shown in FIG. 20.

The signal processing IC 21 of each detector module 11A reads an analog signal from each pixel electrode 2 of the scatterer detector 10A in each frame period, carries out the analog-digital conversion to the read analog signal to generate the pixel electrode measurement data. As mentioned above, the pixel electrode measurement data are data showing a signal level of the analog signal read from each pixel electrode 2. The pixel electrode measurement data obtained from the scatterer detector 10A in this way are transferred to the data processing section 15 of the data transfer device 14, and are scored in the temporary storing area of the memory 16. At this time, the time data corresponding to the pixel electrode measurement data (the time data synchronized with the generation of the pixel electrode measurement data) are stored in the temporary storing area 16a of the memory 16 in addition to the pixel electrode measurement data obtained from the scatterer detector 10A.

On the other hand, the signal processing IC 23 of each detector module 11A reads an analog signal from each back electrode 3 of the absorber detector 10B in each frame period, carries out the analog-digital conversion to the read analog signal and generates the back electrode measurement data. The back electrode measurement data obtained from the scatterer detector 10A in this way, are transferred to the data processing section 17 of the data transfer device 14.

Moreover, the signal processing IC 21 of each detector module 11B reads the analog signal from each pixel electrode of the absorber detector 10B in each frame period, and carries out the analog-digital conversion to the read analog signal to generate the pixel electrode measurement data. The pixel electrode measurement data obtained from the absorber detector 10B in this way are transferred to the data processing section 17 of the data transfer device 14.

In FIG. 20, the pixel electrode measurement data obtained in the frame period (more strictly, the pixel electrode measurement data generated from the analog signal read from each pixel electrode 2 of the scatterer detector 10A and the absorber detector 10B in the $k^{th}$ frame period) is shown by a symbol $D_{PIXEL}(k)$. Also, in the back electrode measurement data obtained in the $k^{th}$ frame period (more strictly, the back electrode measurement data generated from the analog signal read from each back electrode 3 of the scatterer detector 10A in the $k^{th}$ frame period) is shown as a symbol $D_R(k)$.

When the back electrode measurement data obtained from each scatterer detector 10A and the pixel electrode measurement data obtained from each absorber detector 10B in each frame period meet a predetermined data acquisition condition, the data processing section 17 reads the pixel electrode measurement data obtained from each scatterer detector 10A and the time data corresponding to them from the memory 16 in the frame period, and transfers the pixel electrode measurement data and the back electrode measurement data obtained from each scatterer detector 10A in the frame period, the pixel electrode measurement data obtained from each absorber detector 10B in the frame period, and the time data corresponding to them to the processing unit 12.

For example, when it is determined from the back electrode measurement data obtained from each scatterer detector 10A in a frame period, and the pixel electrode measurement data obtained from each absorber detector 10B that an electromagnetic radiation is inputted to either of the scatterer detector 10A or the absorber detector 10B in the frame period, the pixel electrode measurement data and the back electrode measurement data obtained from each scatterer detector 10A in the frame period, and the pixel electrode measurement data obtained from each absorber detector 10B in the frame period may be transferred to the processing unit 12. As another example, when it is determined from the back electrode measurement data obtained from each scatterer detector 10A in a frame period and the pixel electrode measurement data obtained from each absorber detector 10B that an electromagnetic radiation has been inputted to one scatterer detector and one absorber detector 10B (the case where the Compton scattering occurred in the scatterer detector 10A and the photoelectric absorption occurred in the absorber detector 10B), the pixel electrode measurement data and the back electrode measurement data obtained from each scatterer detector 10A in the frame period, and the pixel electrode measurement data obtained from each absorber detector 10B in the frame period may be transferred to the processing unit 12. The pixel electrode measurement data and the back electrode measurement data sent from data processing section 17 to the processing unit 12 are stored in the storage device 12a of the processing unit 12.

For example, as shown in FIG. 20, it is supposed to be determined that the back electrode measurement data obtained from each scatterer detector 10A and the pixel electrode measurement data obtained from each absorber detector 10B in the $N^{th}$ frame period meet the predetermined data acquisition condition (for example, an electromagnetic radiation has been determined to be inputted to either of the scatterer detector 10A or the absorber detector 10B). In this case, the data processing section 17 transfers the pixel electrode measurement data $D_{PIXEL}(N)$ obtained from each scatterer detector 10A and each absorber detector 10B in the $N^{th}$ frame period, the back electrode measurement data $D_R(N)$ obtained from each absorber detector 10B, and the time data corresponding to them to the processing unit 12. At this time, as for the pixel electrode measurement $D_{PIXEL}(N)$ obtained from each scatterer detector 10A, the pixel electrode measurement data corresponding to the frame period which meets the data acquisition condition are selected while referring to the time data, and the selected pixel electrode measurement data and the corresponding time data are read from the temporary storing area 16a and are transferred to the processing unit 12.

In the operation shown in FIG. 20, the pixel electrode measurement data $D_{PIXEL}(N)$ obtained from each scatterer detector 10A and each absorber detector 10B and the back electrode measurement data $D_R(N)$ from each absorber detector 10B in the $N^{th}$ frame period are transferred to the processing unit 12 in the following frame period (the $(N+1)^{th}$ frame period). However, the timing of the transfer to the processing unit 12 of the pixel electrode measurement data and the back electrode measurement data obtained in the $N^{th}$ frame period can be selected appropriately after detection of the incidence of the electromagnetic radiation.

The processing unit 12 carries out the calculation of a track of the above-mentioned recoil electron (Step S02), the extraction of the event (Step S03), the reconstruction of Compton cone (Step S04), and the generation and display of a radiation source distribution image (step S05) based on the pixel electrode measurement data, the back electrode measurement data, and the time data corresponding to them which are stored in the storage device 12*a*. In this place, in the reconstruction of Compton cone at step S04, the processing unit 12 may improve calculation precision of the energy $E_1$ acquired by the recoil electron in the Compton scattering by using the back electrode measurement data obtained from the scatterer detector 10A in addition to the pixel electrode measurement data obtained from each scatterer detector 10A.

According to the operation described above, necessary data of the pixel electrode measurement data obtained from the scatterer detector 10A can be selectively transferred to the processing unit 12. Unnecessary pixel electrode measurement data are not transferred to the processing unit 12. Therefore, it is possible to reduce a quantity of data to be processed by the processing unit 12. Such an advantage is conspicuous, especially, when many pixel electrodes 2 are provided for the scatterer detector 10A.

Third Embodiment

In the second embodiment, the scatterer detector 10A is configured, to have the structure of the plurality of back electrodes 3 as shown in FIG. 11 to FIG. 16. However, in the Compton camera 20B of the third embodiment, the above-mentioned structure is adopted in which the plurality of back electrodes 3 are provided in the absorber detector 10B.

Figure 21:
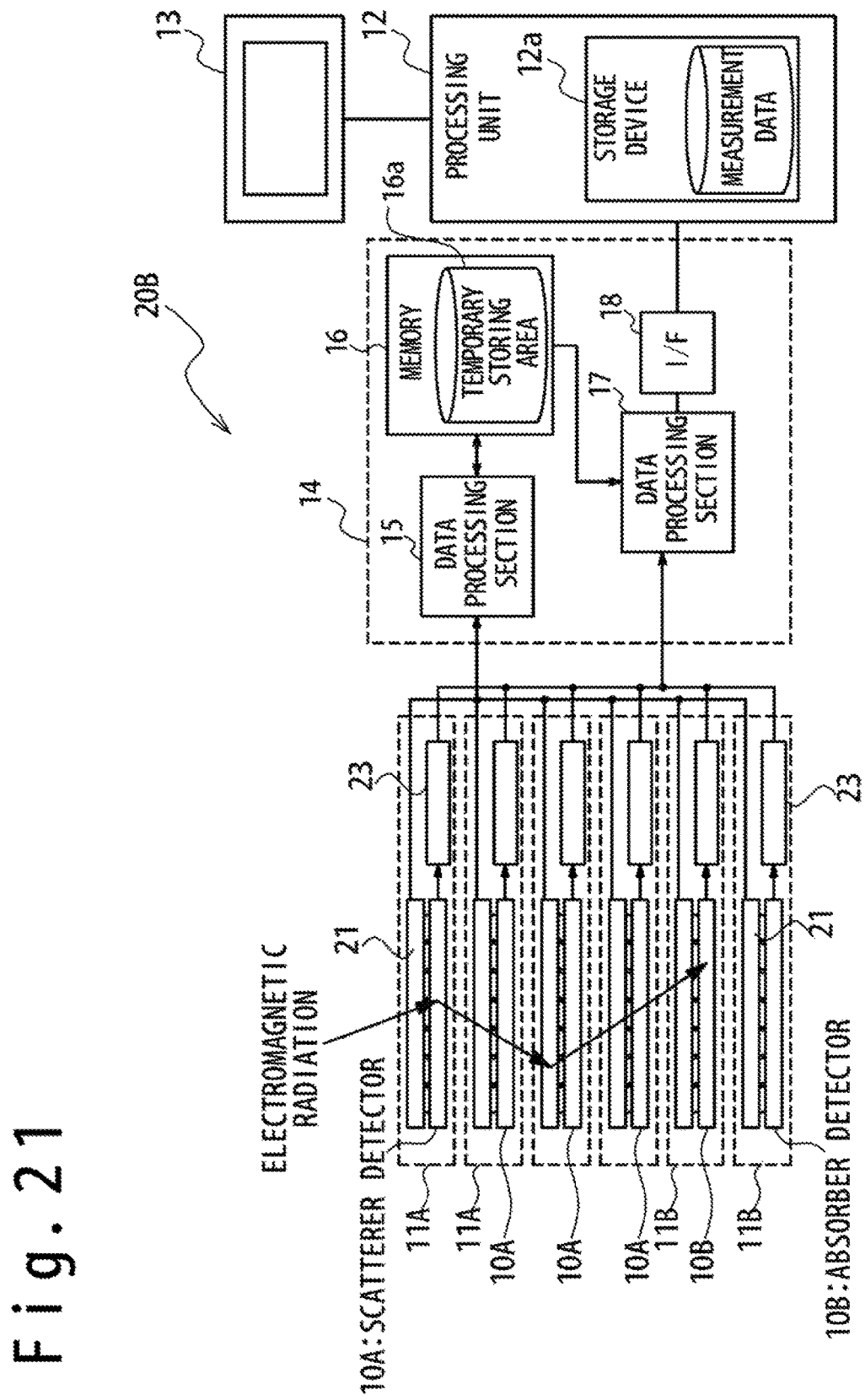
FIG. 21 is a block diagram showing an example of the configuration of Compton camera in a third embodiment.

FIG. 21 is a block diagram of an example of configuration of the Compton camera 20B in the third embodiment. The configuration of Compton camera 20B in the third embodiment is similar to that of the Compton camera 20A in the second embodiment. However, in the Compton camera 20B of the third embodiment, the configuration of the detector module 11B loaded with the absorber detector 10B is changed to the configuration similar to the detector module 11A loaded with the scatterer detector 10A, following the change of the configuration of the absorber detector 10B.

Figure 22:
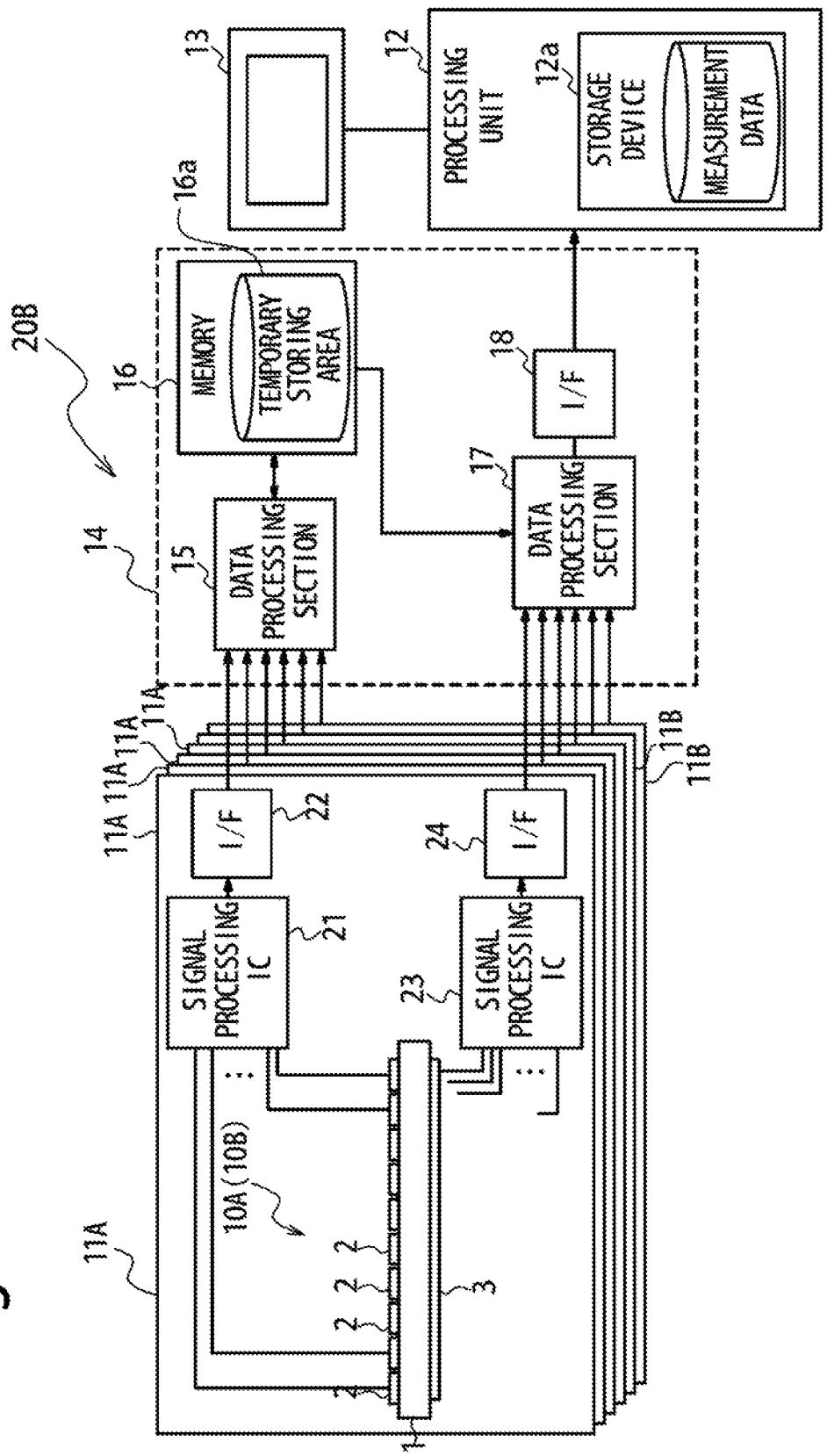
FIG. 22 is a block diagram showing an example of configuration of the detector module of Compton camera in the third embodiment.

FIG. 22 is a block diagram showing the configuration of detector modules 11A and 11B, and the configuration of the data transfer device 14 in the Compton camera 20B of the third embodiment. The detector module 11A includes the scatterer detector 10A, the signal processing ICs 21 and 23 and the interfaces 22 and 24 in the third embodiment, like the second embodiment. In the same way, the detector module 11B includes the absorber detector 10B, and the signal processing ICs 21 and 23 and the interfaces 22 and 24. The configuration of detector module 11B is same as that of the detector module 11A except for the point that the absorber detector 10B is substituted for the scatterer detector 10A.

Here, in the Compton camera 20B of the third embodiment, all of the pixel electrode measurement data obtained from the scatterer detector 10A and the absorber detector 10B are transferred to the data processing section 15, and stored in the temporary storing area 16*a* of the memory 16. On the other hand, all of the back electrode measurement data obtained from the scatterer detector 10A and the absorber detector 10B are transferred to the data processing section 17. The data processing section 17 processes the back electrode measurement data obtained from each scatterer detector 10A and each absorber detector 10B.

In detail, the data processing section 17 determines whether or not the pixel electrode measurement data and the back electrode image data obtained from each scatterer detector 10A and each absorber detector 10B in each frame period and the time data corresponding to them should be transferred to the processing unit 12. In the present embodiment, this determination is carried out based on the back electrode measurement data obtained from each scatterer detector 10A and each absorber detector 10B. The pixel elect rode measurement data, the back electrode measurement data and the time data corresponding to them transferred to the processing unit 12 are stored in the storage device 12*a*, and are used for the specification of incidence direction of electromagnetic radiation and the calculation the spatial distribution of radiation sources.

More specifically, when the back electrode measurement data obtained from each scatterer detector 10A and each absorber detector 10B in a frame period meets a predetermined data acquisition condition, the data processing section 17 transfers the pixel electrode measurement data and the back electrode measurement data obtained from each scatterer detector 10A in the frame period and the pixel electrode measurement data obtained from each absorber detector 10B in the frame period to the processing unit 12. Here, note that the pixel electrode measurement data obtained from each scatterer detector 10A and each absorber detector 10B have been stored in the temporary storing area 16*a* of the memory 16 together with the time data referring to the time data, the data processing section 17 selects the pixel electrode measurement data corresponding to the frame period which meets the data acquisition condition, from the pixel electrode measurement data obtained from each scatterer detector 10A and each absorber detector 10B, to read from the temporary storing area 16*a*, and transmits the pixel electrode measurement data read from the temporary storing area 16*a* to the processing unit 12. The transfer of pixel electrode measurement data and back electrode measurement data to the processing unit 12 is carried out through the interface 18.

Next, the operation of Compton camera 20B in the third embodiment will be described. A procedure of calculating the spatial distribution of radiation sources in the Compton camera 20A of the present embodiment is almost similar to the operation of the Compton camera 20 and 20A in the first and second embodiments (reference to FIG. 9). The measurement data (the pixel electrode measurement data and the back electrode measurement data) are acquired (Step S01), and a track of the recoil electron is calculated (Step S02). An event is extracted by using the track of the recoil electron calculated at the step S02 (Step S03). About the extracted event, the reconstruction of Compton cones, i.e. the incidence direction of the electromagnetic radiation is specified (Step S04). Moreover, the spatial distribution of radiation sources is calculated by using the specified incidence directions of the electromagnetic radiations. The generation and display of the radiation source distribution image showing the spatial distribution of radiation sources are carried out (Step S05).

However, in the point that the pixel electrode measurement data and the back electrode measurement data obtained from each scatterer detector 10A and each absorber detector 10B are transferred to the processing unit 12 in the frame period, when the back electrode measurement data obtained from each scatterer detector 10A and each absorber detector 10B in each frame period meet a predetermined data acquisition condition in the acquisition of the measurement data (step S01), the third embodiment is different from the second embodiment in the Compton camera 20. In such an operation, in the third embodiment, the necessary data of the pixel electrode measurement data obtained from each scatterer detector 10A and each absorber detector 10B are selectively transferred to the processing unit 12, and a quantity of pixel electrode measurement data to be process by the processing unit 12 can be more reduced than in the second embodiment.

When the back electrode measurement data obtained from each scatterer detector 10A and each absorber detector 10B in each frame period meet the predetermined data acquisition condition, the data processing section 17 reads the pixel electrode measurement data obtained from each scatterer detector 10A and each absorber detector 10B in the frame period from the memory 16, and transfers the pixel electrode measurement data and the back electrode measurement data obtained from each scatterer detector 10A and each absorber detector 10B in the frame period, and the time data corresponding to them to the processing unit 12. Note that the pixel electrode measurement data obtained from each scatterer detector 10A and each absorber detector 10B have been stored in the temporary storing area 16a of the memory 16 together with the time data. Referring to the time data, the data processing section 17 selects the pixel electrode measurement data corresponding to the frame period which meets the data acquisition condition, from the pixel electrode measurement data obtained from each scatterer detector 10A and each absorber detector 10B to read from the temporary storing area 16a, and transmits the pixel electrode measurement data read from the temporary storing area 16a to the processing unit 12.

For example, when it is determined from the back electrode measurement data obtained from each scatterer detector 10A and each absorber detector 10B in a frame period that an electromagnetic radiation has been inputted to either of the scatterer detector 10A or the absorber detector 10B in the frame period, the pixel electrode measurement data and the back electrode measurement data obtained from each scatterer detector 10A and each absorber detector 10B in the frame period may be transferred to the processing unit 12. At this time, the pixel electrode measurement data, corresponding to the frame period which meets the data acquisition condition, are selected from the pixel electrode measurement data obtained from each scatterer detector 10A and each absorber detector 10B while referring to the time data, and the selected pixel electrode measurement data are transferred to the processing unit 12. As another example, when it is determined from the back electrode measurement data obtained from each scatterer detector 10A and each absorber detector 10B in a frame period that the electromagnetic radiation is inputted to one scatterer detector and one absorber detector 10B (it is supposed that the Compton scattering occurs in the one scatterer detector 10A and the photoelectric absorption occurs in the absorber detector 10B), the pixel electrode measurement data and the back electrode measurement data obtained from each scatterer detector 10A and each absorber detector 10B in the frame period may be transferred to the processing unit 12. The pixel electrode measurement data and the back electrode measurement data sent from the data processing section 17 to the processing unit 12 are stored in the storage device 12a of the processing unit 12. In this case, in the same way, the pixel electrode measurement data, corresponding to the frame period which meets the data acquisition condition, are selected from the pixel electrode measurement data obtained from each scatterer detector 10A and each absorber detector 10B, while referring to the time data, and the selected pixel electrode measurement data are transferred to the processing unit 12.

The processing unit 12 carries out the calculation of a track of a recoil electron (Step S02), the extraction of an event (Step S03), the reconstruction of Compton cone (Step S04), and the generation and display of the radiation source distribution image (step S05) as mentioned above, based on the pixel electrode measurement data and the back electrode measurement data stored in the storage device 12a. Here, in the reconstruction of Compton cone at step S04, the processing unit 12 may calculate the energy $E_1$ acquired by the recoil electron in the Compton scattering in an improved precision by using the pixel electrode measurement data obtained from each scatterer detector 10A and the back electrode measurement data obtained from the scatterer detector 10A. In addition, the processing unit 12 may calculate the energy $E_2$ of the photon absorbed in the photoelectric absorption in an improved precision based on the pixel electrode measurement data obtained from each absorber detector 10B and the back electrode measurement data obtained from the absorber detector 10B.

According to the operation described above, necessary data of the pixel electrode measurement data obtained from the scatterer detector 10A and the absorber detector 10B can be selectively transferred to the processing unit 12. Unnecessary pixel electrode measurement data are not transferred to the processing unit 12. Therefore, it is possible to reduce a quantity of data to be processed by the processing unit 12. Such an advantage is conspicuous, especially, when the pixel electrodes 2 of a large number are provided for the scatterer detector 10A and the absorber detector 10B.

As described, the embodiments of the present invention are variously described but the present invention is not limited to the above-mentioned embodiments. It would be clear to the skilled person that the present inventions can be implemented with various changes.

EXPLANATION OF REFERENCE NUMERALS 20, 20A, 20B: Compton camera
1: semiconductor substrate
1a: face main surface
1b: reverse main surface
2, 2a, 2b, 2c: pixel electrode
3: back electrode
10: semiconductor detector
10A: scatterer detector
10B: absorber detector
11, 11A, 11B: detector module
12: processing unit
12a: storage
13: display device
14: data transfer device
15: data processing section
16: memory
16a: temporary save area
17: data processing section
18: interface
21, 23: signal processing IC
21a: pad
22, 24: interface
25: printed circuit substrate
26: wiring line
27: wiring line
28: bump

The invention claimed is:

1. A radiation measuring apparatus comprising:
at least one scatterer detector functioning as a scatterer that scatters an electromagnetic radiation from a measurement object;
at least one absorber detector functioning as an absorber that absorbs the electromagnetic radiation; and
a processing unit,
wherein each of the scatterer detector and the absorber detector comprises:
a semiconductor substrate; and
a plurality of pixel electrodes arranged in a matrix on a first main surface of the semiconductor substrate,
wherein the plurality of pixel electrodes are arranged such that a distance between centers of two neighbor pixel electrodes is smaller than a mean free path of a recoil electron generated in Compton scattering of the electromagnetic radiation,
wherein the processing unit extracts events based on signals obtained from the scatterer detector and the absorber detector, and specifies an incidence direction of the electromagnetic radiation based on a recoiling direction to which a recoil electron recoils, to each of the extracted events, in each of which the Compton scattering has occurred in either of the scatterer detectors, the recoil electron generated in the Compton scattering in either of the scatterer detectors recoils to a direction having an in-plane component of the semiconductor substrate in an inside of the scatterer detector in which the Compton scattering has occurred, and photoelectric absorption has occurred in which the photon scattered in the Compton scattering is absorbed in either of the absorber detectors,
wherein the scatterer detector further comprises a plurality of back electrodes arranged on a second main surface which is opposite to the first main surface of the semiconductor substrate,
wherein each of the plurality of back electrodes of the scatterer detector is arranged to be opposite to more than one of the plurality of pixel electrodes of the scatterer detector,
wherein a number of the plurality of back electrodes is less than a number of the plurality of pixel electrodes in each of the scatterer detectors,
wherein the radiation measuring apparatus further comprises:
a first signal processing section configured to generate first pixel electrode measurement data from a first analog signal read from the plurality of pixel electrodes of the scatterer detector;
a temporary storing area provided to temporarily store the first pixel electrode measurement data;
a second signal processing section configured to generates back electrode measurement data from a second analog signal read from the plurality of back electrodes of the scatterer detector; and
a data processing section,
wherein the data processing section reads from the temporary storing area, pixel electrode measurement data which are selected the first pixel electrode measurement data according to the back electrode measurement data, to transfer to the processing unit,
wherein the processing unit carries out extraction of the event and specification of the incidence direction of the electromagnetic radiation based on the selected pixel electrode measurement data.

2. The radiation measuring apparatus according to claim 1, wherein energy of a photon of the electromagnetic radiation of the measurement object is in a range of 0.3 to 2.0 MeV, and
wherein the plurality of pixel electrodes of the scatterer detector and the absorber detector are arranged such that the distance of the centers of the two neighbor pixel electrodes is equal to or less than 20 µm.

3. The radiation measuring apparatus according to claim 1, wherein the first signal processing section stores time data generated in synchronization with the generation of the first pixel electrode measurement data in the temporary storing area together with the first pixel electrode measurement data, and
wherein the data processing section refers to the time data to select the selected pixel electrode measurement data from the first pixel electrode measurement data.

4. The radiation measuring apparatus according to claim 1, further comprising:
a third signal processing section configured to generate second pixel electrode measurement data from a third analog signal read from the plurality of pixel electrodes of the absorber detector,
wherein the data processing section selects the selected pixel electrode measurement data according to the back electrode measurement data and the second pixel electrode measurement data.

5. The radiation measuring apparatus according to claim 4, wherein the data processing section transfers to the processing unit, the first pixel electrode measurement data obtained in a frame period, the second pixel electrode measurement data, and the back electrode measurement data, when the back electrode measurement data and the second pixel electrode measurement data obtained in the frame period meet a predetermined condition, and
wherein the the processing unit carries out the extraction of the event and the specification of the incidence direction of the electromagnetic radiation based on the first pixel electrode measurement data, the second pixel electrode measurement data, and the back electrode measurement data obtained in the frame period.

6. The radiation measuring apparatus according to claim 1, wherein the first signal processing section is integrated into a signal processing IC, and
wherein each of the plurality of pixel electrodes of the scatterer detector is connected with a pad prepared in the signal processing IC through a bump.

7. The radiation measuring apparatus according to claim 1, wherein the plurality of pixel electrodes of the scatterer detector are arranged in a first direction parallel to the first main surface and to a second direction parallel to the first main surface and perpendicular to the first direction,
wherein each of the plurality of back electrodes is formed to extend to the first direction, and
wherein the plurality of back electrodes are arranged to row in the second direction.

8. A radiation measuring apparatus comprising:
at least one scatterer detector functioning as a scatterer that scatters an electromagnetic radiation from a measurement object;
at least one absorber detector functioning as an absorber that absorbs the electromagnetic radiation; and
a processing unit, wherein each of the scatterer detector and the absorber detector comprises:

a semiconductor substrate; and a plurality of pixel electrodes arranged in a matrix on a first main surface of the semiconductor substrate, wherein the plurality of pixel electrodes are arranged such that a distance between centers of two neighbor pixel electrodes is smaller than a mean free path of a recoil electron generated in Compton scattering of the electromagnetic radiation, wherein the processing unit extracts events based on signals obtained from the scatterer detector and the absorber detector, and specifies an incidence direction of the electromagnetic radiation based on a recoiling direction to which a recoil electron recoils, to each of the extracted events, in each of which the Compton scattering has occurred in either of the scatterer detectors, the recoil electron generated in the Compton scattering in either of the scatterer detectors recoils to a direction having an in-plane component of the semiconductor substrate in an inside of the scatterer detector in which the Compton scattering has occurred, and photoelectric absorption has occurred in which the photon scattered in the Compton scattering is absorbed in either of the absorber detectors, wherein each of the scatterer detector and the absorber detector comprises a plurality of back electrodes arranged on the second main surface which is opposite to the first main surface of the semiconductor substrate, wherein each of the plurality of back electrodes is arranged to be opposite to more than one of the plurality of pixel electrodes, wherein a number of the plurality of back electrodes is less than a number of the plurality of pixel electrodes in each of the scatterer detector and the absorber detector, wherein the radiation measuring apparatus further comprises:

a first signal processing section configured to generate pixel electrode measurement data from a first analog signal read from the plurality of pixel electrodes of the scatterer detector and the absorber detector;

a temporary storing area provided to temporarily store the pixel electrode measurement data;

a second signal processing section configured to generate back electrode measurement data from a second analog signal read from the plurality of back electrode of the scatterer detector and the absorber detector; and a data processing section, wherein the data processing section reads from the temporary storing area, pixel electrode measurement data which are selected from the pixel electrode measurement data according to the back electrode measurement data, to transfer to the processing unit, and wherein the processing unit carries out the extraction of the event and the specification of the incidence direction of the electromagnetic radiation based on the selected pixel electrode measurement data.

* * * * *